US009676330B2

(12) United States Patent
Takemae et al.

(10) Patent No.: US 9,676,330 B2
(45) Date of Patent: Jun. 13, 2017

(54) ROADSIDE OBJECT DETECTION APPARATUS

(71) Applicants: Yoshinao Takemae, Yokohama (JP); Akihiro Watanabe, Nagoya (JP)

(72) Inventors: Yoshinao Takemae, Yokohama (JP); Akihiro Watanabe, Nagoya (JP); Fumiya Ichino, Nagakute (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 229 days.

(21) Appl. No.: 14/402,197

(22) PCT Filed: Oct. 26, 2012

(86) PCT No.: PCT/JP2012/077808
§ 371 (c)(1),
(2) Date: Nov. 19, 2014

(87) PCT Pub. No.: WO2013/190719
PCT Pub. Date: Dec. 27, 2013

(65) Prior Publication Data
US 2015/0165972 A1 Jun. 18, 2015

(30) Foreign Application Priority Data
Jun. 19, 2012 (JP) ................... 2012-138141

(51) Int. Cl.
G06T 7/00 (2017.01)
G06T 7/60 (2017.01)
(Continued)

(52) U.S. Cl.
CPC ............ B60R 1/00 (2013.01); G06K 9/00791 (2013.01); G06K 9/00798 (2013.01);
(Continued)

(58) Field of Classification Search
CPC ................ B60R 1/00; B60W 2550/10; B60W 2550/145; G06K 9/00791; G06K 9/00798;
(Continued)

(56) References Cited

U.S. PATENT DOCUMENTS 6,169,572 B1 * 1/2001 Sogawa ................ G01S 3/7864
348/113
2003/0011509 A1 * 1/2003 Honda ................... G01S 7/412
342/70

(Continued)

FOREIGN PATENT DOCUMENTS

JP 7-271978 10/1995
JP 11-14376 1/1999

(Continued)

OTHER PUBLICATIONS

Tingbo Hu, et al., "Roadside curb detection based on fusing stereo vision and mono vision", Fourth International Conference on Machine Vision (ICMV 2011): Computer Vision and Image Analysis; Pattern Recognition and Basic Technologies, Proc. of SPIE, vol. 8350, (2011), 8 pages.

(Continued)

Primary Examiner — Reza Aghevli
(74) Attorney, Agent, or Firm — Oblon, McClelland, Maier & Neustadt, L.L.P.

(57) ABSTRACT

A roadside object detection apparatus to detect a roadside object by analyzing images, detecting height information of an object in the images in a neighboring region having a distance less than or equal to a threshold from a vehicle, detecting a change of a height of a road surface due to the roadside object from the height information in the neighboring region, determining positions having the change of the height detected as characteristic points of the roadside object, extrapolating the characteristic points into a far-off (Continued)

region having a distance greater than or equal to the threshold from the vehicle, based on a road model, setting a search range for the roadside object in the far-off region based on a virtual line that is obtained by the characteristic points being extrapolated by the characteristic point extrapolation unit, and detecting the roadside object in the far-off region based on the search range.

8 Claims, 26 Drawing Sheets

(51) Int. Cl.
    *H04N 7/18* (2006.01)
    *B60R 1/00* (2006.01)
    *G06K 9/00* (2006.01)
    *G06T 7/73* (2017.01)
    *G06T 7/593* (2017.01)

(52) U.S. Cl.
    CPC .......... *G06K 9/00805* (2013.01); *G06T 7/593* (2017.01); *G06T 7/60* (2013.01); *G06T 7/73* (2017.01); *H04N 7/181* (2013.01); *B60W 2550/10* (2013.01); *B60W 2550/145* (2013.01); *G06T 2207/10021* (2013.01); *G06T 2207/20061* (2013.01); *G06T 2207/30256* (2013.01); *G06T 2207/30261* (2013.01); *H04N 7/18* (2013.01)

(58) Field of Classification Search
    CPC ...... G06K 9/00805; G06T 2207/10021; G06T 2207/20061; G06T 2207/30256; G06T 2207/30261; G06T 7/0042; G06T 7/0075; G06T 7/60; H04N 7/18; H04N 7/181
    See application file for complete search history.

(56) References Cited

U.S. PATENT DOCUMENTS

| | | | | |
|---|---|---|---|---|
| 2009/0085913 A1* | 4/2009 | Sakamoto | .......... | G06K 9/00798 345/420 |
| 2009/0240432 A1* | 9/2009 | Osanai | .......... | G06T 7/0044 701/300 |
| 2010/0097458 A1* | 4/2010 | Zhang | .......... | G06K 9/00798 348/119 |
| 2010/0100268 A1* | 4/2010 | Zhang | .......... | B60W 30/09 701/25 |
| 2010/0104199 A1* | 4/2010 | Zhang | .......... | G06K 9/00798 382/199 |
| 2011/0261168 A1* | 10/2011 | Shima | .......... | B60T 7/22 348/47 |
| 2012/0185167 A1 | 7/2012 | Higuchi et al. | | |
| 2013/0135090 A1* | 5/2013 | Granruth | .......... | G08G 1/01 340/439 |
| 2013/0223686 A1* | 8/2013 | Shimizu | .......... | G08G 1/166 382/103 |

FOREIGN PATENT DOCUMENTS

| JP | 2007-18037 | | 1/2007 |
|---|---|---|---|
| JP | 2007-232389 | | 9/2007 |
| JP | 2011-28659 | | 2/2011 |
| JP | 2013-142972 | A | 7/2013 |
| JP | 2013-161190 | A | 8/2013 |

OTHER PUBLICATIONS

Jan Siegemund, et al., "A Temporal Filter Approach for Detection and Reconstruction of Curbs and Road Surfaces based on Conditional Random Fields", 2011 IEEE Intelligent Vehicles Symposium (IV), (Jun. 5-9, 2011), pp. 637-642.

Jan Siegemund, et al., "Curb Reconstruction using Conditional Random Fields", 2010 IEEE Intelligent Vehicles Symposium, (Jun. 21-24, 2010), pp. 203-210.

Thomas Michalke, et al., "A Self-Adaptive Approach for Curbstone/ Roadside Detection based on Human-Like Signal Processing and Multi-Sensor Fusion", 2010 IEEE Intelligent Vehicles Symposium, (Jun. 21-24, 2010), pp. 307-312.

Florin Oniga, et al., "Curb Detection Based on a Multi-Frame Persistence Map for Urban Driving Scenarios", 11$^{th}$ International IEEE Conference, (Oct. 12-15, 2008), 6 pages.

International Search Report issued Jan. 15, 2013, in PCT/JP2012/ 077808, filed Oct. 26, 2012.

Albert S. Huang, et al., "Finding multiple lanes in urban road networks with vision and lidar" Auton Robot, vol. 26, XP019670021, 2009, pp. 103-122.

Radu Danescu, et al., "Probabilistic Lane Tracking in Difficult Road Scenarios Using Stereovision" IEEE Transactions on Intelligent Transportation Systems, vol. 10, No. 2, XP011347172, Jun. 2009, pp. 272-282.

Florin Oniga, et al., "Processing Dense Stereo Data Using Elevation Maps: Road Surface, Traffic Isle, and Obstacle Detection" IEEE Transactions on Vehicular Technology, vol. 59, No. 3, XP011299067, Mar. 2010, pp. 1172-1182.

* cited by examiner

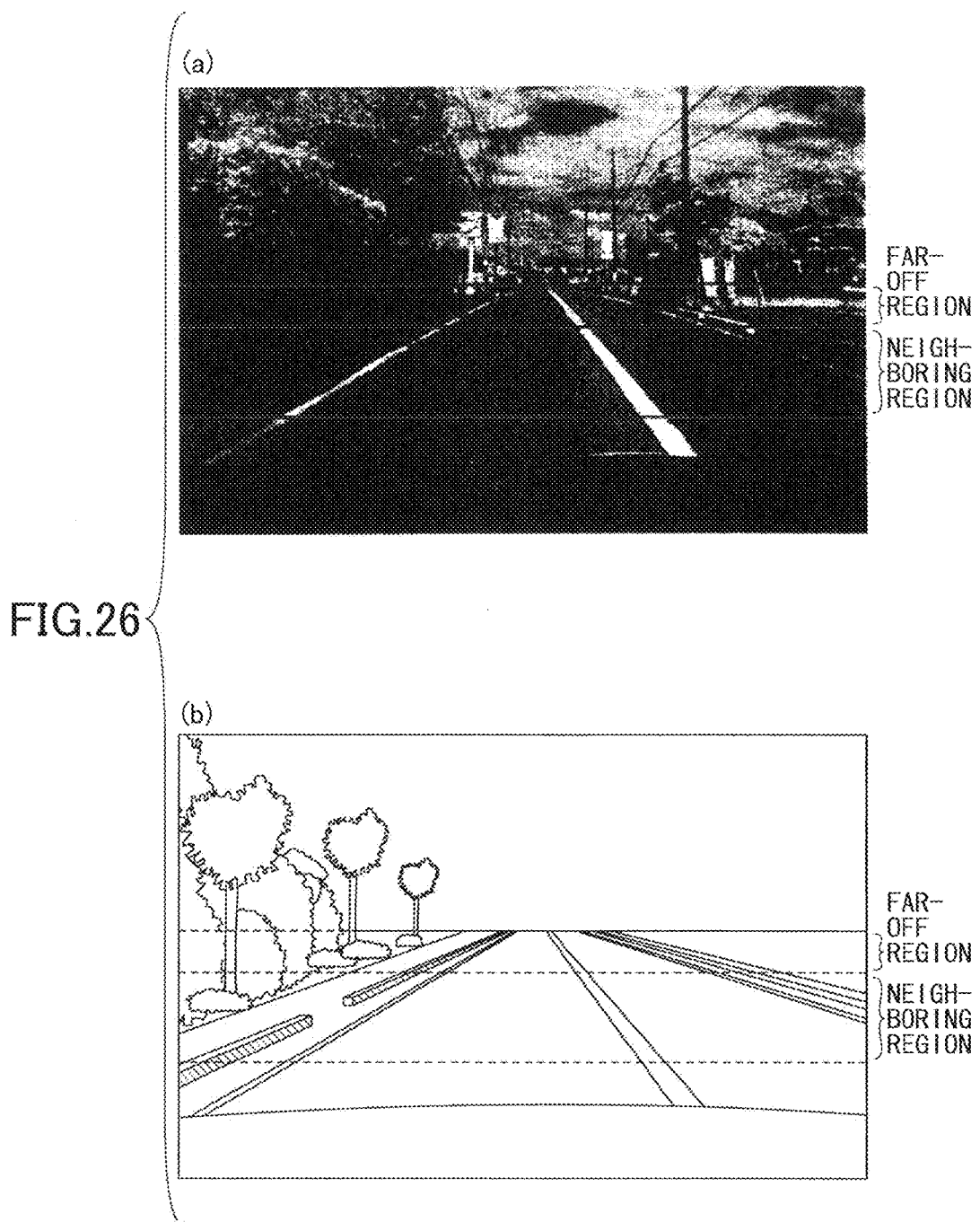

ROADSIDE OBJECT DETECTION APPARATUS

TECHNICAL FIELD

The present invention relates to a roadside object detection apparatus to detect a roadside object using multiple captured images.

BACKGROUND ART

Technologies have been known that perform various drive supports such as prevention of going out of a lane using white lines captured by a camera on a vehicle. When white lines are not detected, or to improve detection precision of the white lines, there are cases where a curbstone or a sidewalk step is detected as a clue of white lines (see, for example, Patent Document 1). Patent Document 1 discloses an image recognition device that detects a curbstone, by using an increasing or decreasing change of the length of a side surface part of the curbstone, and an increasing or decreasing change of the length of a parallel part parallel to a road surface, depending on the distance from a camera.

However, the image recognition device disclosed in Patent Document 1 has a problem in that it is difficult to detect a curbstone at a comparatively distant place from the vehicle.

FIG. 26(a) is an example of a diagram illustrating a conventional captured image of a far-off curbstone and a neighboring curbstone, and FIG. 26(b) is an example of a schematic view of the photograph of FIG. 26(a). There is a curbstone on the left side of a vehicle, and the side wall part of the curbstone is captured in the shade. As the lengths of the side surface part and the parallel part parallel to the road surface look shorter when going further, it is difficult for a detection method described in Patent Document 1 to detect a far-off curbstone.

[Patent Document 1] Japanese Laid-open Patent Publication No. 2007-018037

SUMMARY OF THE INVENTION

Problem to be Solved by Invention

In view of the above, it is an object of the present invention to provide a roadside object detection apparatus capable of detecting a roadside object such as a far-off curbstone.

Means to Solve the Problem

According to at least one embodiment of the present invention, a roadside object detection apparatus to detect a roadside object using a plurality of captured images includes a height information detection unit configured to analyze the captured images, and to detect height information of an object in the captured images in a neighboring region having a distance less than or equal to a threshold from a vehicle having the roadside object detection apparatus installed; a height change detection unit configured to detect a change of a height of a road surface due to the roadside object from the height information in the neighboring region; a characteristic point extrapolation unit configured to determine positions having the change of the height detected as characteristic points of the roadside object, and to extrapolate the characteristic points into a far-off region having a distance greater than or equal to the threshold from the vehicle, based on a road model; and a roadside object detection unit configured to set a search range for the roadside object in the far-off region based on a virtual line that is obtained by the characteristic points being extrapolated by the characteristic point extrapolation unit, and to detect the roadside object in the far-off region based on the search range.

Advantage of the Invention

It is possible to provide a roadside object detection apparatus capable of detecting a roadside object such as a far-off curbstone.

BRIEF DESCRIPTION OF DRAWINGS

FIG. 9 is an example of diagrams illustrating a road coordinate system, a plane coordinate system, and the like;

FIG. 26 is an example of diagrams illustrating a conventional captured image of a far-off curbstone and a neighboring curbstone.

Figure 1:
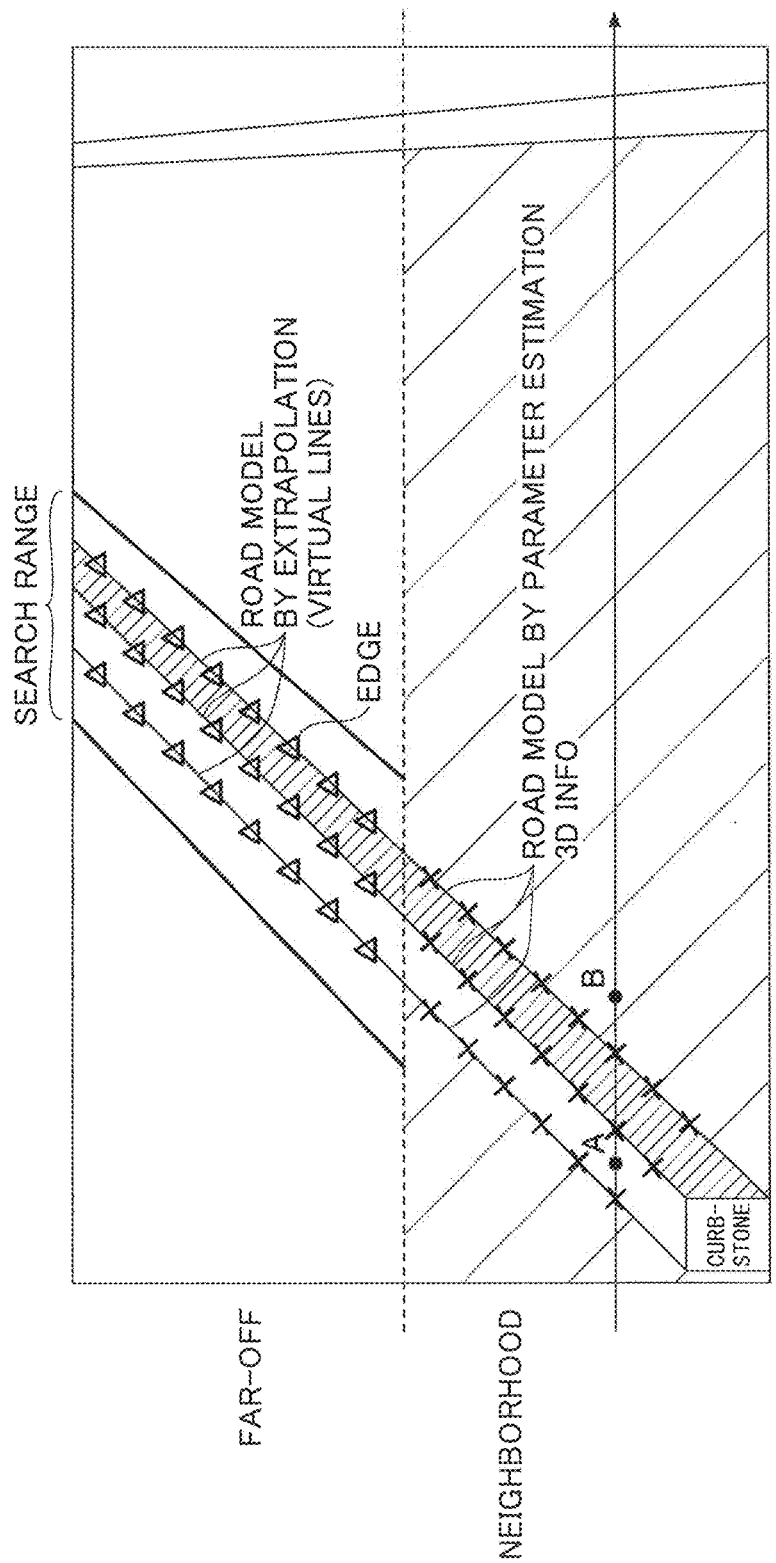
FIG. 1 is an example of a diagram generally illustrating detection of a roadside object by a roadside object detection apparatus.

DESCRIPTION OF REFERENCE SYMBOLS 11 right camera
12 left camera
13 camera computer
21 stereo image obtainment unit
22 distortion correction and parallelization unit
23 edge extraction unit
24 parallax calculation unit
25 road surface detection unit
26 road surface structure estimation unit
27 step determination unit
28 roadway parameter estimation unit
29 search range setting unit
30 edge segment detection unit
32 template matching unit
33 white line detection unit
34 preceding vehicle detection unit
100 white line detection device

MODE FOR CARRYING OUT THE INVENTION

In the following, embodiments of the present invention will be described with reference to the drawings.

First Embodiment

FIG. 1 is an example of a diagram generally illustrating detection of a roadside object by a roadside object detection apparatus. First, the roadside object detection apparatus captures an image in the traveling direction of a vehicle by a stereo camera to obtain 3D information. Although the 3D information may be obtained from the entire image, the roadside object detection apparatus only uses a neighboring region to estimate a road surface structure. Only the neighboring region of the image is used because an error difference of parallax tends to be included in a far-off region.

Using the 3D information or the road surface structure, the roadside object detection apparatus detects characteristic points in the neighboring region that form a step having a certain height or greater. For example, it scans the image data in the horizontal direction to detect a step that may be inferred as a curbstone. The pixel on the curbstone such as point A in the figure. has a height different from that of the pixel not on the curbstone such as point B. Therefore, the step formed by the curbstone can be detected. Roadside objects here include, for example, a curbstone, a sidewalk step, and any other objects on the ground installed higher than the road surface.

Three points are detected as the characteristic points of a step of a curbstone by a single scanning in the horizontal direction (X marks in the figure). Note that two points are detected for a sidewalk step because the sidewalk has the same height as the curbstone.

By using such a position (coordinates) of a step in a road model, coefficients of the road model (roadway parameters) can be obtained. Here, the road model is a representational form of a road form represented by a formula and its coefficients. Once the road model is determined, a range of a curbstone can be estimated in a far-off region where the 3-D information has not been detected, but by applying extrapolation to the road model. Extrapolation of the road model means to calculate points determined by the formula of the road model in a far-off region. A set of these points form a line, which is referred to as a "virtual line" in the embodiments.

In an image of a far-off region, it is expected that a step of a curbstone is detected as an edge, similarly in a neighborhood region. Thereupon, a search range for an edge is set by moving a virtual line left and right in the horizontal direction. The roadside object detection apparatus detects an edge of the curbstone in this search range (triangular marks in the figure).

Three virtually parallel lines should be detected for a curbstone, and two for a sidewalk step. Therefore, the roadside object detection apparatus extracts line segments from the edge by converting the edge into a straight line. Then, if three virtually parallel lines are detected within a certain distance in the horizontal direction, it is determined as a curbstone, or if two virtually parallel lines are detected within a certain distance in the horizontal direction, it is determined as a sidewalk step.

Thus, by using the 3-D information of a neighboring region where correct distance information can be obtained, detection precision can be improved for a far-off curbstone or a sidewalk step.

Configuration Example

Figure 2:
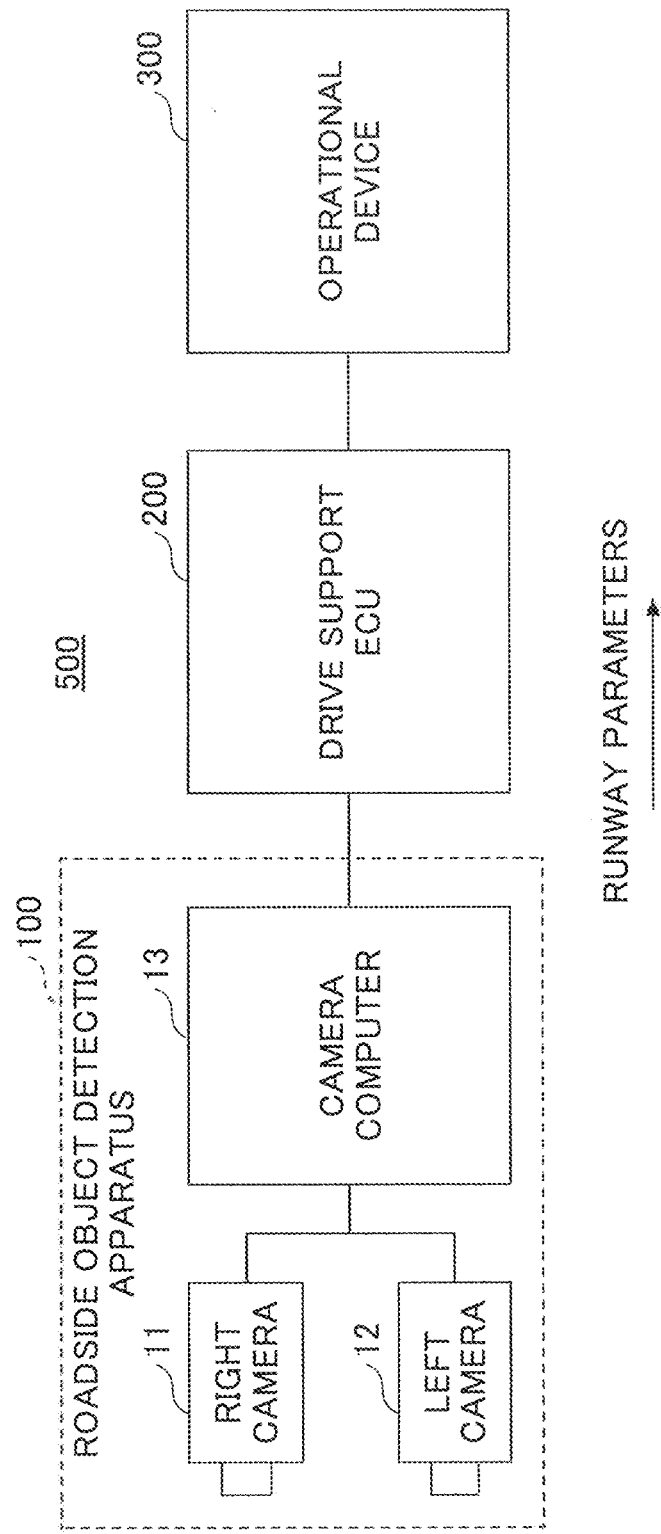
FIG. 2 is an example of a general configuration diagram of the drive support system including a roadside object detection apparatus.

FIG. 2 is an example of a general configuration diagram of a drive support system 500 including a roadside object detection apparatus 100. The drive support system 500 includes the roadside object detection apparatus 100, a drive support ECU (Electronic Control Unit) 200 and an operational device 300, which are connected with each other via an in-vehicle LAN such as a CAN (Controller Area Network) bus.

The roadside object detection apparatus 100 transmits target information about an obstacle in addition to parameters, which will be described later, to the drive support ECU 200. The drive support ECU 200 determines whether a drive support is required based on the roadway parameters and the target information, and requests an operation to the operational device 300 when necessary. The operational device 300 includes, for example, an alarm device on a meter panel, an electric power steering device, and a brake actuator.

The roadway parameters include, for example, a road curvature (radius), a lane width of the road, a lateral position of the vehicle in the lane, and a yaw angle of the vehicle relative to the road. The drive support ECU 200 executes a drive support using information (for example, wheel speed, a steering angle, and a yaw rate) detected by other ECUs connected with the in-vehicle LAN or sensors. LDW (Lane Departure Warning) and LKA (Lane Keeping Assist) have been known as drive supports using roadway parameters. LDW is a drive support that draws a driver's attention by an alarm or vibration if there is a risk that the vehicle goes out of a lane, from the lateral position, the yaw angle, and the vehicle speed. LKA is a drive support that controls an electric power steering device to add a steering torque to the steering shaft, or controls breaking on each wheel or engine output so that the vehicle runs on targeted running lines within the lane. Other than controlling a steering torque, breaking on each wheel, or engine output so that the vehicle runs on the targeted running lines, there is a type of LKA that controls to keep in the lane when there is a risk that the vehicle goes out of the lane. In this way, it is possible to provide various drive supports by detecting white lines. Note that the roadway parameters can be detected from white lines in the present embodiment. If it is difficult to detect white lines, the roadway parameters can be detected from a curbstone or a sidewalk step.

Also, the target information includes, for example, distance information, relative speed, and an orientation (lateral position). The drive support ECU 200 extracts an obstacle having a risk of collision from the orientation (lateral position), and executes a drive support such as issuing an alarm sound or slowing down if TTC (Time To Collision) calculated from the distance information and the relative speed comes under a predetermined value.

The roadside object detection apparatus 100 includes a right camera 11, a left camera 12, and a camera computer 13. The right camera 11 and the left camera 12 constitute a single stereo camera. The stereo camera is disposed, for example, on a rearview mirror having the optical axis face in the front direction of the vehicle, or maybe disposed on another place such as a rooftop. The right camera 11 and the left camera 12 are disposed separated by a predetermined interval (base line length). The right camera 11 and the left camera 12 have individual imaging elements, respectively, such as CCDs, CMOSs, and back illumination CMOSs. The right camera 11 and the left camera 12 may be monochrome cameras to obtain just brightness information, or may be color cameras.

The right camera 11 and the left camera 12 periodically capture images in a predetermined range in front of the vehicle at virtually the same time, respectively. If a white line is marked on the road surface, the captured images may include a curbstone (or a sidewalk step) and the white line. Note that a white line is just an example of the road marking to separate lanes. Therefore, when referring to a white line in the present embodiment, it may be a line-shaped road marking having a color other than white, a dotted line, a dashed line, Botts' dots or cat's-eyes.

The camera computer 13 is a computer including a CPU, a ROM, a RAM, a CAN controller, an input/output I/F, and other general circuits. The camera computer 13 executes distortion correction and parallelization, detection of a step, estimation of roadway parameters, detection of line segments in a far-off region, as will be described later.

[Functions of Camera Computer]

Figure 3:
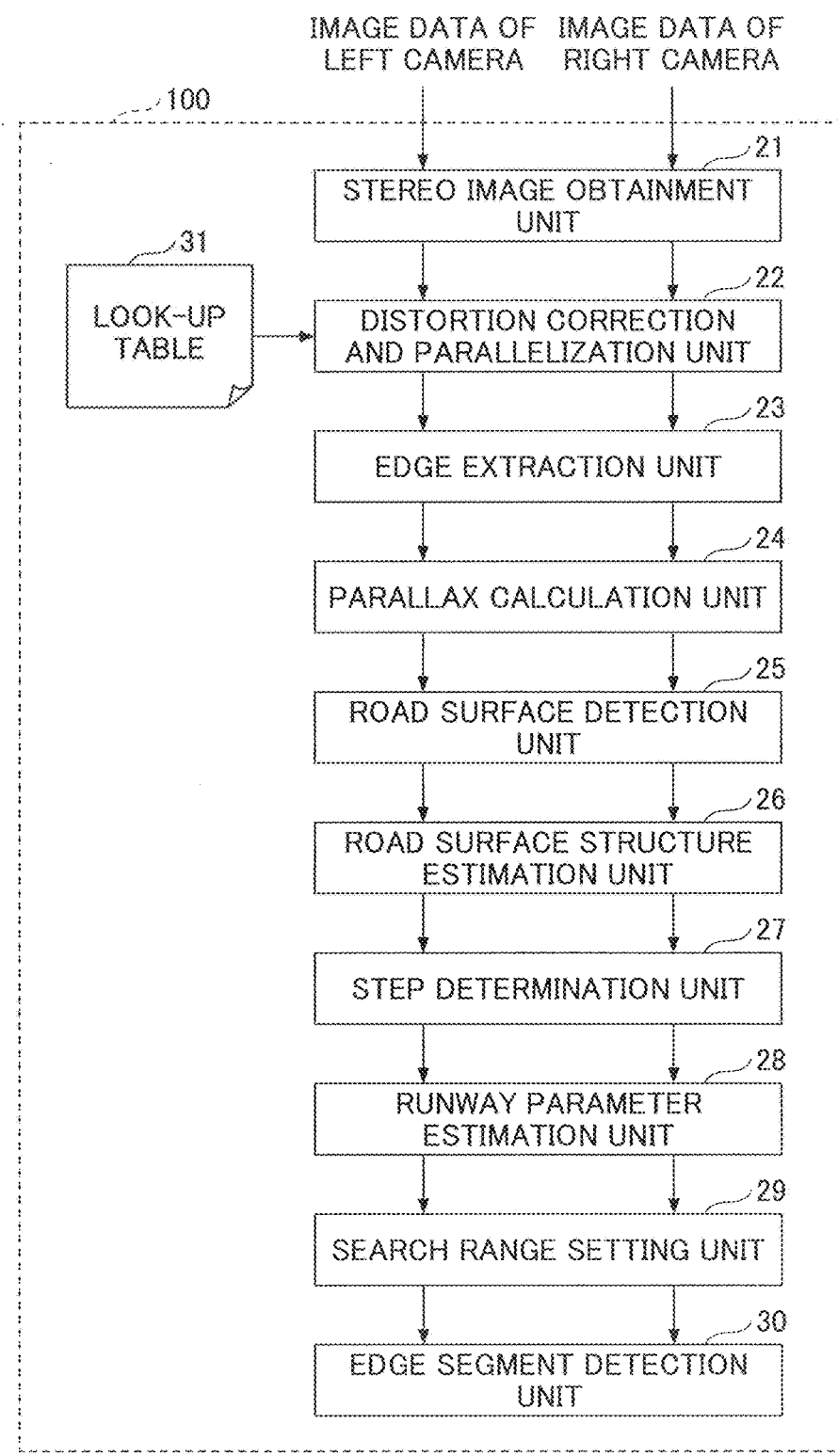
FIG. 3 is an example of a functional block diagram of a camera computer.

FIG. 3 is an example of a functional block diagram of the camera computer 13. The camera computer 13 includes a stereo image obtainment unit 21, a distortion correction and parallelization unit 22, an edge extraction unit 23, a parallax detection section 24, a road surface detection unit 25, a road surface structure estimation unit 26, a step determination unit 27, a roadway parameter estimation unit 28, a search range setting unit 29, and an edge segment detection unit 30.

Figure 4:
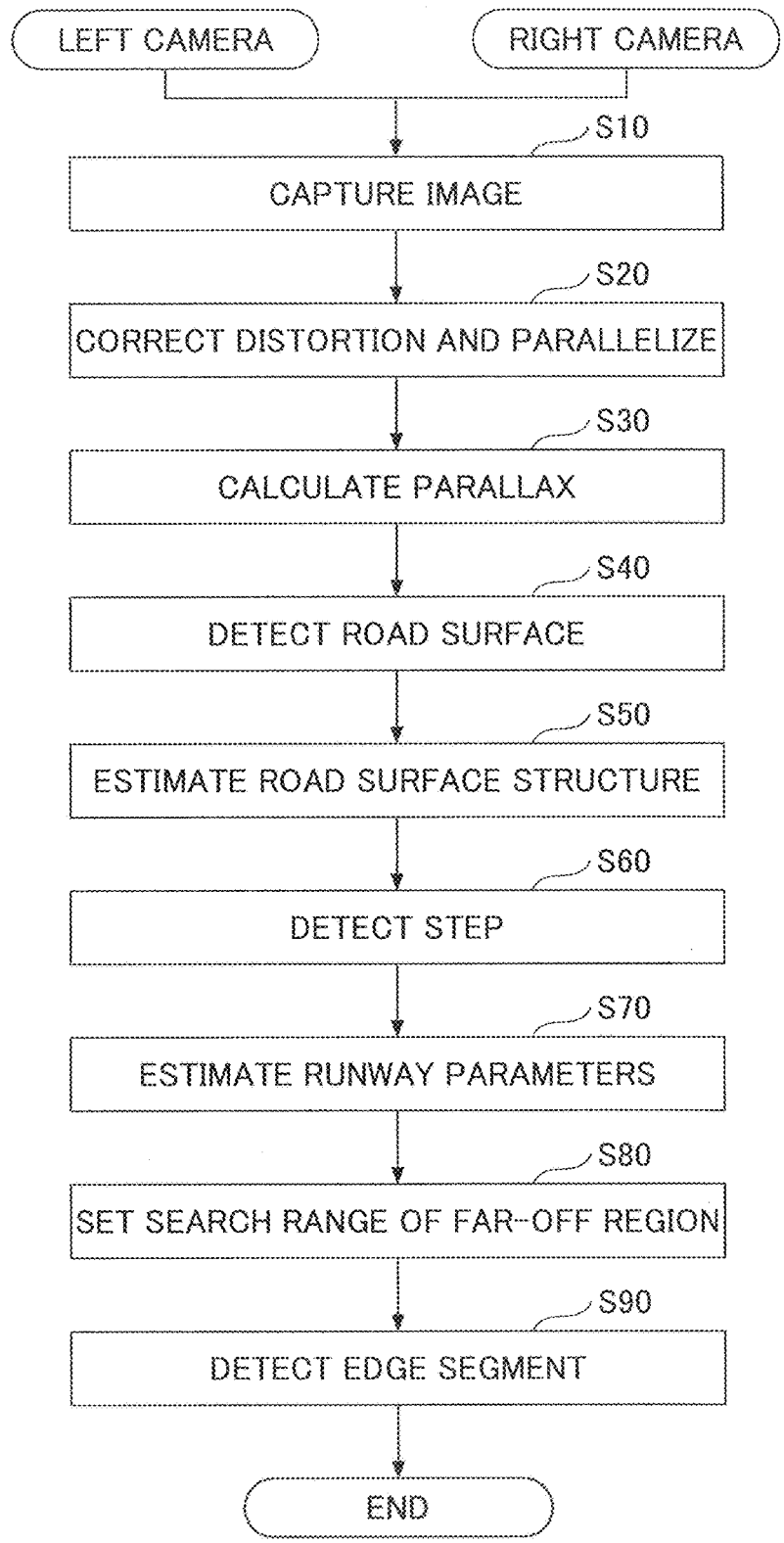
FIG. 4 is a flowchart illustrating operational steps of a roadside object detection apparatus.

These functions are activated while the roadside object detection unit 100 executes steps illustrated in the flowchart of FIG. 4. These functions will be described based on FIG. 4 in order below. Note that the steps in FIG. 4 are repeatedly executed every time a pair of left and right images is captured.

<S10 Obtainment of Image Data>

The stereo image obtainment unit 21 obtains image data periodically captured by the right camera 11, and image data periodically captured by the left camera 12, and stores the image data in a buffer.

<S20 Distortion Correction and Parallelization>

The distortion correction and parallelization unit 22 corrects distortion of the left and right images using external parameters and internal parameters of the camera obtained in advance, and parallelizes the images. The inside parameters include, for example, respective distortion of lenses, distortion aberration, distortion of imaging elements, and focal distances of the right camera 11 and left camera 12. The effect of distortion of a lens can be reduced by correcting image data by referring to a correction conversion table generated based on design values of the lens. The effect of distortion aberration can be reduced by correcting image data based on a parameter estimation using a distortion aberration model in the radius direction.

The external parameters include, for example, numerical values of the attached position and the direction of a camera. As the attached positions (for example, heights) and directions (pitches, rolls, and yaws) of the left and right cameras have tiny differences, there are cases where the optical axes of the right camera and the left camera 12 do not have a completely equivalent height, and are not parallel to each other. Therefore, due to differences of the external parameters, for example, imaging systems of the right camera 11 and the left camera 12 may be relatively rotated with each other around the optical axes. To reduce such rotation, the stereo camera has calibration applied before shipment by a vehicle manufacturer. In calibration, a chart for distortion calibration is captured by the right camera 11 and the left camera 12, respectively. A lattice of black and white squares is drawn in a checkerboard pattern on the chart for calibration. For example, a correspondence relationship between pixels is identified so that the black and white squares in the image of the left camera 12 correspond to the black and white squares in the image of the right camera 11. The correspondence relationship is registered into a table in which, for example, for each pixel of the right camera 11, the position of a pixel before correction is associated with a converted position of the pixel.

The table corresponds to a lookup table 31 in FIG. 4 that includes data for distortion correction and parallelization for left and right images based on the internal parameters and the external parameters. By applying distortion correction and parallelization in this way, it is possible to search for parallax efficiently.

Figure 5:
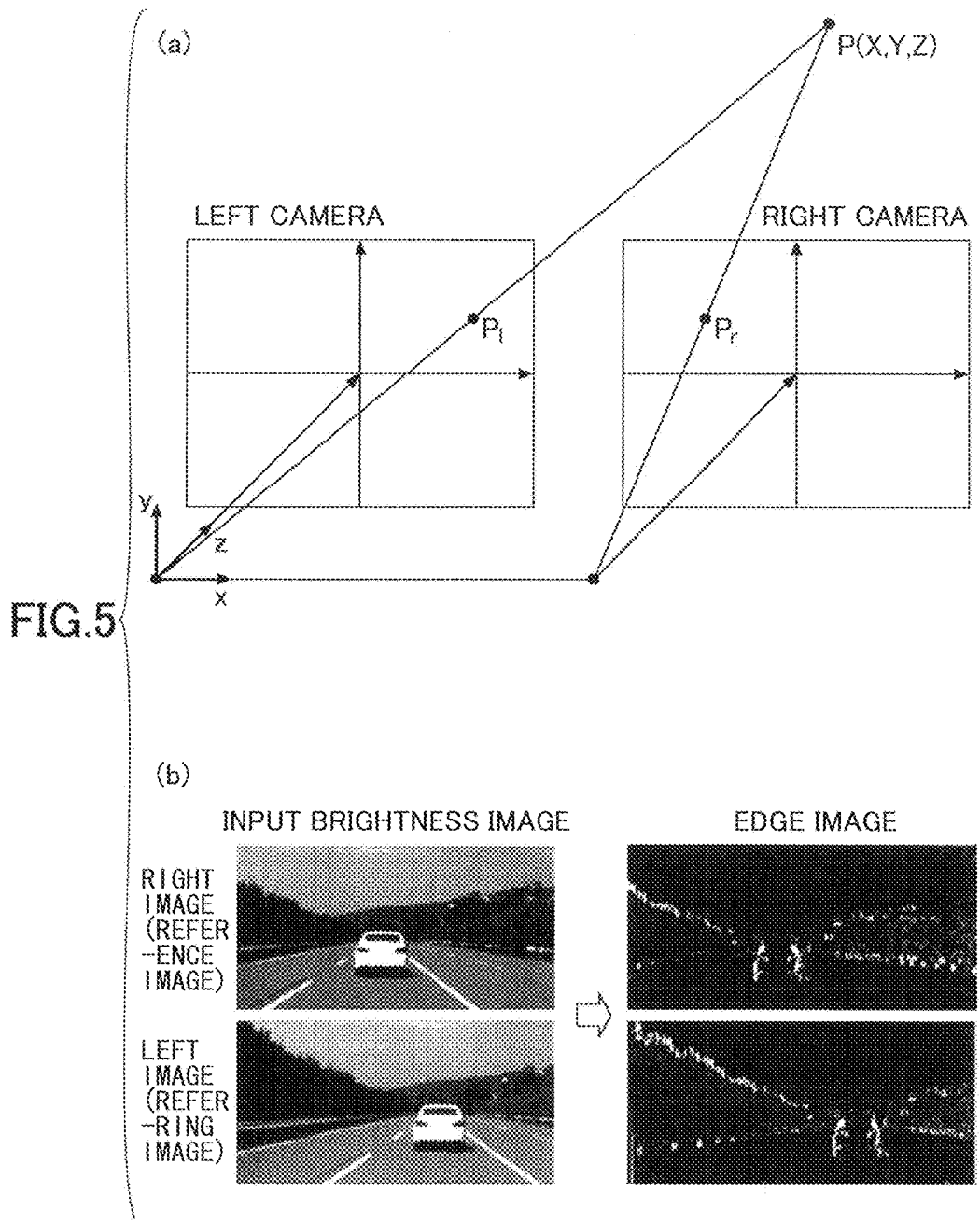
FIG. 5 includes diagrams illustrating an example of a filter process.

FIG. 5(a) is a diagram illustrating an example of parallelized image data of the right camera 11 and image data of the left camera 12. In the present embodiment, a road coordinate system is adopted in which the X axis corresponds to the vehicle width direction, the Y axis corresponds to the vehicle height direction, and the Z axis corresponds to the traveling direction. Coordinates P(X,Y,Z) correspond to a pixel P1 of the left camera 12 and a pixel Pr of the right camera 11.

<S30 Parallax Calculation>

When detecting a parallax, correspondence between the pixel P1 and the pixel Pr is searched for. As two images have parallelization applied already, the roadside object detection apparatus 100 just needs to search for the correspondence in the image data only in a direction parallel to the horizontal direction.

Note that although the parallax search may be executed for the left and right image data having parallelization applied by the distortion correction and parallelization unit 22, the search can be made much easier after applying an edge highlight process to the image data. Thereupon, the edge extraction unit 23 extracts edges in the left and right images. Among various filters that have been known for edge extraction, a sobel filter may be used, for example.

FIG. 5(b) is a diagram illustrating an example of a result of a filter process. In original images, white lines, a guardrail, and trees are captured by the right camera 11 and the left camera 12. The filter process makes edge parts of these white lines, guardrail and trees highlighted (designated by white pixels in the figure).

Figure 6:
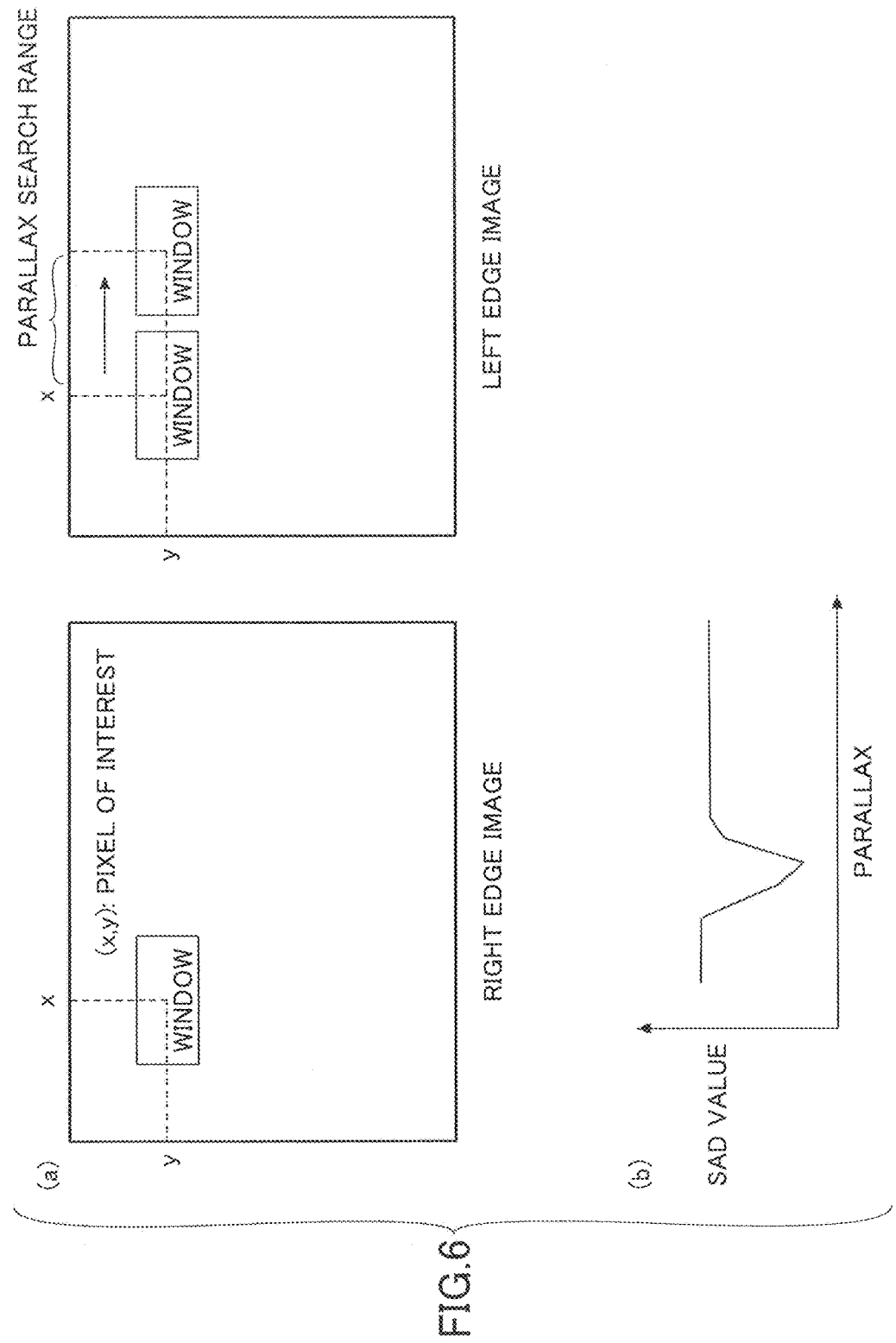
FIG. 6 is an example of diagrams illustrating search for parallax.

FIG. 6(a) is an example of a diagram illustrating search for parallax. Here, by paying attention to a pixel of interest in the right image data, a region in the left image data is identified that corresponds to (has a highest correlation or a predetermined correlation or greater with) a reference region in the right image data. The parallax calculation unit 27 calculates an SAD (Sum of Absolute Difference) or an SSD (Sum of Squared Differences) for each region including the pixel of interest (referred to as a "window"). The SAD is the sum of absolute values of differences between pixel values, and the SSD is the sum of squares of differences of pixel values. For either of them, a smaller value means a higher equivalence between the images included in the window.

As illustrated, when paying attention to a pixel at (x, y), a rectangular window is generated centered on the pixel at (x, y), and the window is also generated in the right image centered on a pixel at (x, y). The parallax calculation unit 27 calculates the SAD or SSD for the window of the left image and the window of the right image, and repeats the calculation of the SAD or SSD by shifting the entire window of the right image to the right by one pixel and another. Namely, as the parallelization has been done already, the window does not need to be shifted in the y axis direction, but just shifted in the x direction one pixel by one pixel in the right image.

FIG. 6(b) illustrates an example of a relationship between a shift amount (parallax) in the x direction and an SAD. The SAD has a minimal value for the shift amount. If there are several minimal values, the shift amount of the pixel having the minimum value is the parallax at the pixel of interest (x, y) in the right image.

It is assumed that the a search range in the X direction is determined in advance. However, the parallax calculation unit 27 may calculate the SAD or SSD for all pixels in the X direction in the right image, may execute calculation without specifying a search range and stop the calculation once a minimal value of the SAD or SSD less than or equal to a threshold is obtained. In the former way, the most reliable parallax is obtained, whereas in the latter way, a parallax reliable to a certain extent is efficiently obtained.

Note that the parallax may be obtained from the brightness image. Also, the parallax may be obtained from the edge image and the brightness image. When using both the edge image and the brightness image, the parallax is determined by taking an average of shift amounts of the pixel with which the SAD or SSD takes minimal values, or by giving weights to the edge image and the brightness image, respectively. This makes it possible to obtain a parallax more precisely.

In addition to an integer parallax obtained by the units of pixels, the parallax calculation unit 27 also calculates a sub-pixel parallax. Known methods to obtain a sub-pixel parallax includes equiangular fitting and parabola fitting.

Also, the parallax may be obtained for the entire image, or may be obtained for a neighboring region considering that it is used only in the neighboring region.

Figure 7:
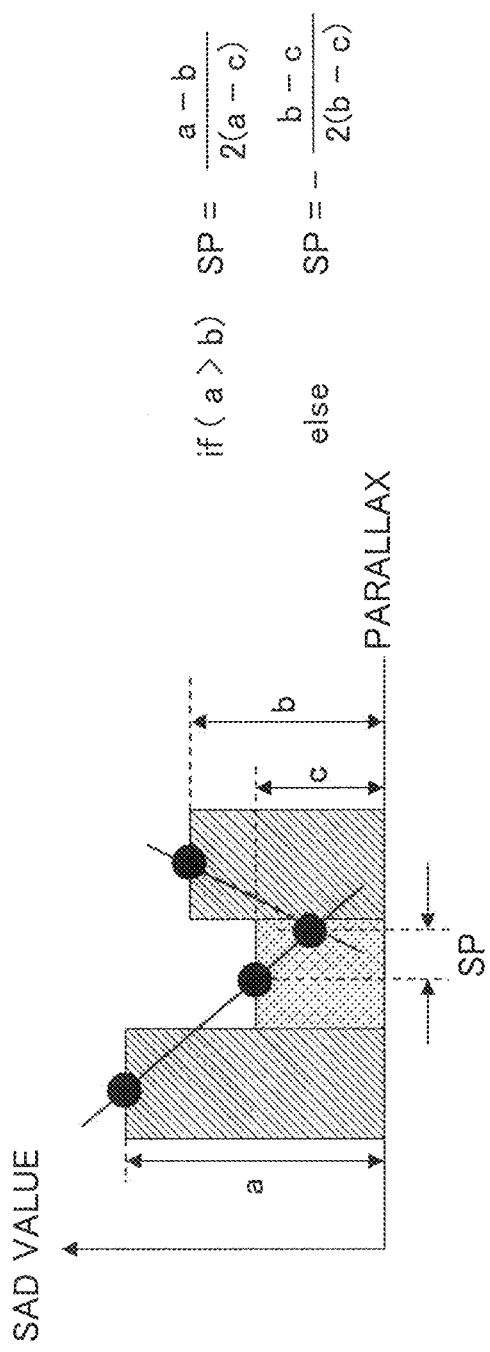
FIG. 7 is a diagram illustrating an example of obtaining a sub-pixel parallax by an equiangular fitting.

FIG. 7 is a diagram illustrating an example of obtaining a sub-pixel parallax by equiangular fitting. FIG. 7 illustrates the parallax for the minimum value of the SAD in FIG. 6B, and SAD values before and after the minimum value. Assume that the minimum SAD value is "c", a SAD value on the side where the parallax is less is "a", and a SAD value on the side where the parallax is greater is "b". If a=b, the parallax corresponding to the minimum SAD value coincides with the sub-pixel parallax. If a>b, the sub-pixel parallax SP takes a value greater than the parallax corresponding to the minimum SAD value as illustrated. If a<b, it is reversed. Equiangular fitting obtains a sub-pixel parallax SP for the parallax corresponding to the minimum SAD value as follows. If a>b, SP=(a−b)/2(a−b)
If a≤b, SP=−(b−c)/2(b−c)

The parallax calculation unit 27 determines the sum of the integer parallax and the sub-pixel parallax SP as the parallax of the pixel of interest. By obtaining the parallax by units of pixels in this way, the distance to an object captured on a pixel can be calculated for each pixel.

<S40 Road Surface Estimation>

The road surface detection unit 25 estimates a structure of the road surface in the parallax image. First, it estimates a region corresponding to the road surface in the image. Note that a region of a road surface is a flat region having no solid objects, without making a distinction between a region of a curbstone or a sidewalk step where pedestrians are moving, and a roadway where vehicles are running.

Figure 8:
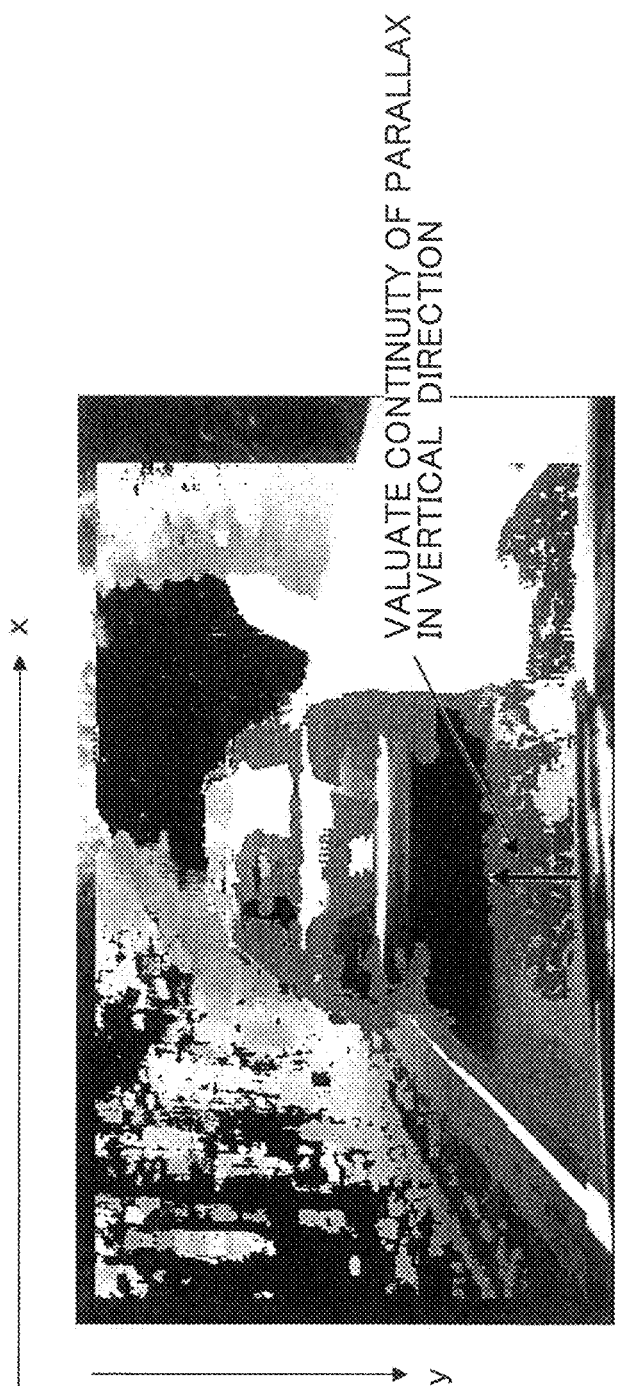
FIG. 8 is an example of a diagram illustrating estimation of a road surface region.

FIG. 8 is an example of a diagram illustrating estimation of a road surface region. FIG. 8 illustrates an image having parallax information superposed. Pixels having the same parallax are processed to have the same brightness, by associating the parallax with brightness to be superposed on the image.

When a solid object is captured in the image, the distances to parts of the solid object are about the same, and so are the parallaxes. On the other hand, the parallax gets greater for a road surface when going further, and hence, the parallax in the y direction changes depending on y value. Therefore, by scanning the image in the y direction from the lower end to the upper and (an arrow in the figure), and if consecutive pixels have parallaxes different but within a predetermined value, it can be determined as a solid object. If consecutive pixels have parallaxes different over the predetermined value, it can be determined as a road surface. Note that the predetermined value may be set to a value less than one pixel because the sub-pixel parallax is obtained in the present embodiment.

When scanning in the direction designated by the arrow in the figure, the parallax of the road surface including a sidewalk and a curbstone gets gradually greater while scanning. In this case, it is determined as a road surface. When scanning over a preceding vehicle, change of the parallax is contained within the predetermined value, and it is determined as a solid object.

<S50 Estimation of Road Surface Structure>

The road surface structure estimation unit 26 estimates a road surface structure using parallax information only in a neighboring region of the vehicle. By using the image data only in a neighboring region, the road structure can be estimated without using parallax information in a far-off region that tends to include error differences. The neighboring region is a region where precision of parallax information is reliable, although it depends on quality and design of a stereo camera. Also, a difference between daytime and night-time or a difference between clear weather and rainy weather may affect precision of parallax information. Consequently, the neighboring region may not be uniquely determined even if the same stereo camera installed on the same vehicle is used. Therefore, the neighboring region is set to have a predetermined margin, considering deteriorated conditions for a region whose parallax information has precision greater than or equal to a threshold (a predetermined number of pixels from the lower end of y coordinates in the image). Namely, the neighboring region is a region a bit narrower than the region whose parallax information has precision greater than or equal to the threshold. Also, the neighboring region may be variably set by detecting daytime or nighttime by an illuminance sensor, and detecting weather by a rain sensor. In this way, parallax information covering a distance as far as possible can be used depending on a circumstance that affects the precision of the parallax information.

First, using the parallax information, the road surface structure estimation unit 26 calculates a distance D to a road surface in the neighboring region.

$$D=(f \times B)/(\Delta d)$$

where f represents the focal distance of lens, B represents a base line length, and $\Delta d$ represents the parallax (the number of pixels multiplied by the pixel pitch of the imaging element).

Figure 9:
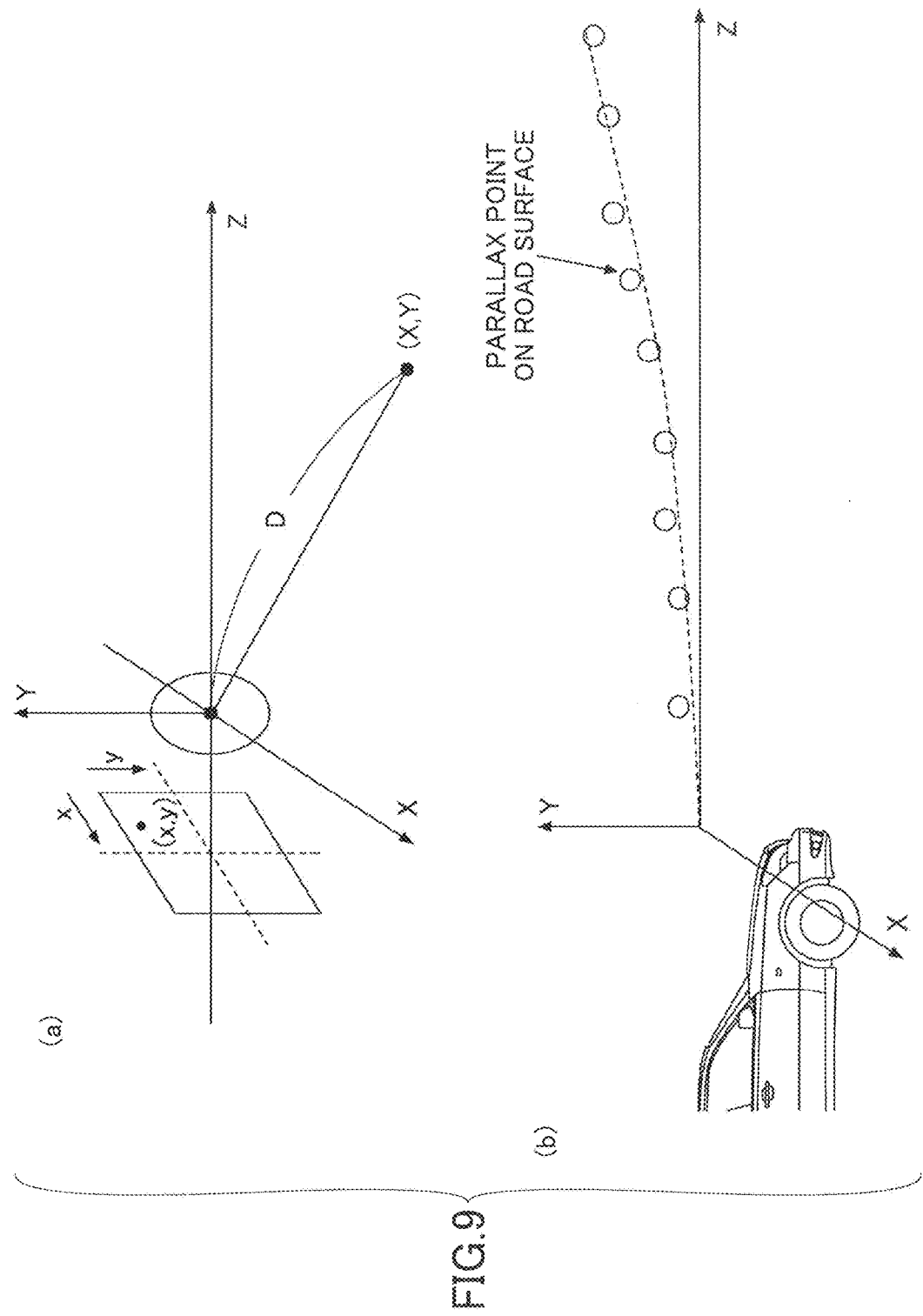

Also, the road coordinate system is adopted as illustrated in FIG. 9(*a*). The center of the lens is set as the origin, the X axis is taken in the horizontal direction from left to right, the Y axis is taken in the height direction of the vehicle, and the Z axis is taken in the traveling direction of the vehicle. Also, the plane coordinate system, which is a coordinate system for points in the image, has the origin on the Z axis of the road coordinate system, the x axis parallel to the X axis, and the y axis parallel to the Y axis. If the distance to an object from the lens is great enough to neglect the focal distance f, the height Y and the lateral position X of the object at the distance D are obtained by the following formulas.

$$X=xD/f$$

$$Y=-yD/f$$

Once X and Y are obtained, Z can be obtained because D is known. The Y coordinate of the road surface can be obtained in this way, which makes it possible to formulate the road surface structure in the Z axis direction.

FIG. 9(*b*) is an example of a diagram illustrating formulation of a road surface structure. A road surface is flat in general, and an upper limit of the slope when designing a road is stipulated by the law except for special landscape. Therefore, it can be approximated by a linear function or a quadratic function. A road surface structure is represented by, for example, Formula (1) below where "a" represents the cross sectional curvature, "b" represents the pitch, and "c" represents the camera height.

$$Y=a \times Z^2 + b \times Z + c \tag{1}$$

The parameters a, b, and c can be determined by substituting the distance D into Z and obtaining Y from the distance D in Formula (1), and using the least squares method or the like. Note that Newton method, Gauss-Newton method, or the like may be used other than the least squares method as long as the coefficients can be recursively obtained.

<S60 Step Detection>

The step determination unit 27 detects a step on the road surface (no distinction is made between a curbstone or a sidewalk step and roadway). By the preceding process, the distance D, the height Y, and the lateral position X have been obtained for each pixel in the region estimated as the road surface. The road surface structure has also been obtained.

The step determination unit 27 detects a step by using at least one of the road surface structure and the height Y. Although a height Y in the 3-D information may be directly used, there are cases where the 3-D information is varied. Therefore, it is favorable to use the height Y obtained from the road structure represented by Formula (1) or the like. However, it is possible to detect a step by directly using the height Y in the 3-D information.

Figure 10:
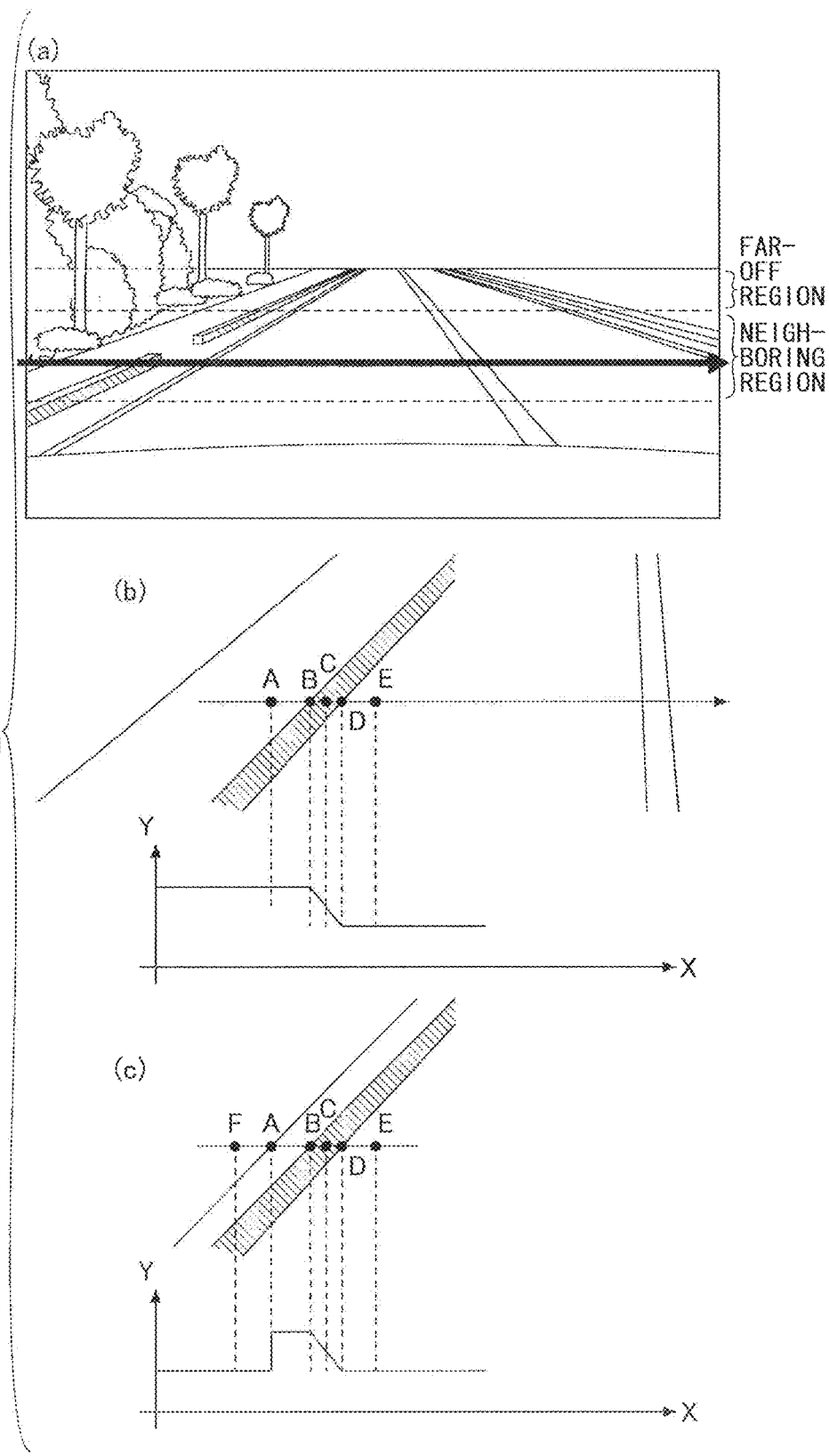
FIG. 10 is an example of diagrams illustrating detection of a step.

FIG. 10 is an example of diagrams illustrating detection of a step. In FIG. 10(*a*), an arrow line (referred to as a "horizontal scanning line") is drawn in the x direction for pixels having a certain value of y coordinate. The step determination unit 27 scans a region in the y direction where the height Y has been obtained, along the horizontal scanning line to read the height Y.

FIG. 10(*b*) is an example of a diagram where pixels are associated with a step. In FIG. 10(*b*), there is a sidewalk step on the left side of the road surface, and hence, the heights of point A and point B are about the same. Pixels between point B and point D correspond to the side surface part of the sidewalk step. Therefore, the height Y takes a value between point B and point D. The height Y of points beyond point D, for example, point E takes a certain value regardless of the X coordinate because the points are positioned on the roadway. Note that the height Y between point B and point D are just schematically drawn. Therefore, the height of point C is just less than or equal to the height Y of point B, and greater than or equal to the height Y of point D.

Then, the step determination unit 27 detects a step because the height Y of point B and the height Y of point D are different (determines that there is a step). Note that the height of a step is stipulated by law, for example, Road Structure Ordinance in Japan. Such a value can be used to set a threshold of a step (for example, 15 cm). The value may be changed depending on a country or a region.

Therefore, if the step determination unit 27 reads the height Y from left to right along the horizontal scanning line and the height Y decreases by the threshold, or if it reads the height Y from right to left in the reverse direction on the horizontal scanning line and the height Y increases by the threshold, it detects a step. Note that the scanning range of the horizontal scanning line may be restricted on the left side of an image relative to its center, to suppress a process load and to improve detection speed of a step.

Also, as a step of a curbstone or a sidewalk step usually raises from the road surface with an angle of about 90 degrees, a range in the X axis direction where the height Y possibly changes may be restricted to, for example, 10 to 30 cm. In this way, it is possible to avoid detecting a step in a place where an object is placed other than a curbstone or a sidewalk step.

The step determination unit 27 identifies point B and point D as characteristic points. Namely, two characteristic points are identified for a single horizontal scanning line. The distance D(Z), and lateral position X of height Y of each of these characteristic points are known.

FIG. 10(*c*) is an example of a diagram where pixels are associated with a step for a curbstone. In case of a curbstone, a region closer to the edge of an image than a curbstone has the same height Y as a roadway. Therefore, point F and point E have about the same height Y. After that, the height Y steeply gets greater at point A, which is kept until reaching point B. Beyond point B, the height is similar to that in FIG. 10(b).

Therefore, if the step determination unit 27 reads the height Y from left to right along the horizontal scanning line and the height Y increases by the threshold, and further reads the height Y from left to right along the horizontal scanning line and the height Y decreases by the threshold, it detects a step. It is similar when scanning in the reverse direction on the horizontal scanning line. Note that, in case of a curbstone, only one of the increase and the decrease of the height Y may be used to detect a step.

The step determination unit 27 identifies point A, point B, and point D as characteristic points. Namely, three characteristic points are identified for a single horizontal scanning line.

Also, although the cross sectional form of a curbstone or a sidewalk step shows a side surface part rising in an angle of 90 degrees in many cases, it is possible to detect a step from the height Y for a rise in an obtuse angle of greater than 90 degrees or an acute angle of less than 90 degrees. Moreover, the cross sectional form of a curbstone or a sidewalk step is not specifically limited. Also, cat's-eyes may be buried in a curbstone or a sidewalk step.

<S70 Estimation of Roadway Parameters>

The roadway parameter estimation unit 28 estimates roadway parameters of a roadway by setting a road model and determining coefficients of the road model. In many cases, a road is designed based on a clothoid curve or a B-spline model. As a curbstone or a sidewalk step is placed along a road, one can expect that the characteristic points are also detected along the road model.

Figure 11:
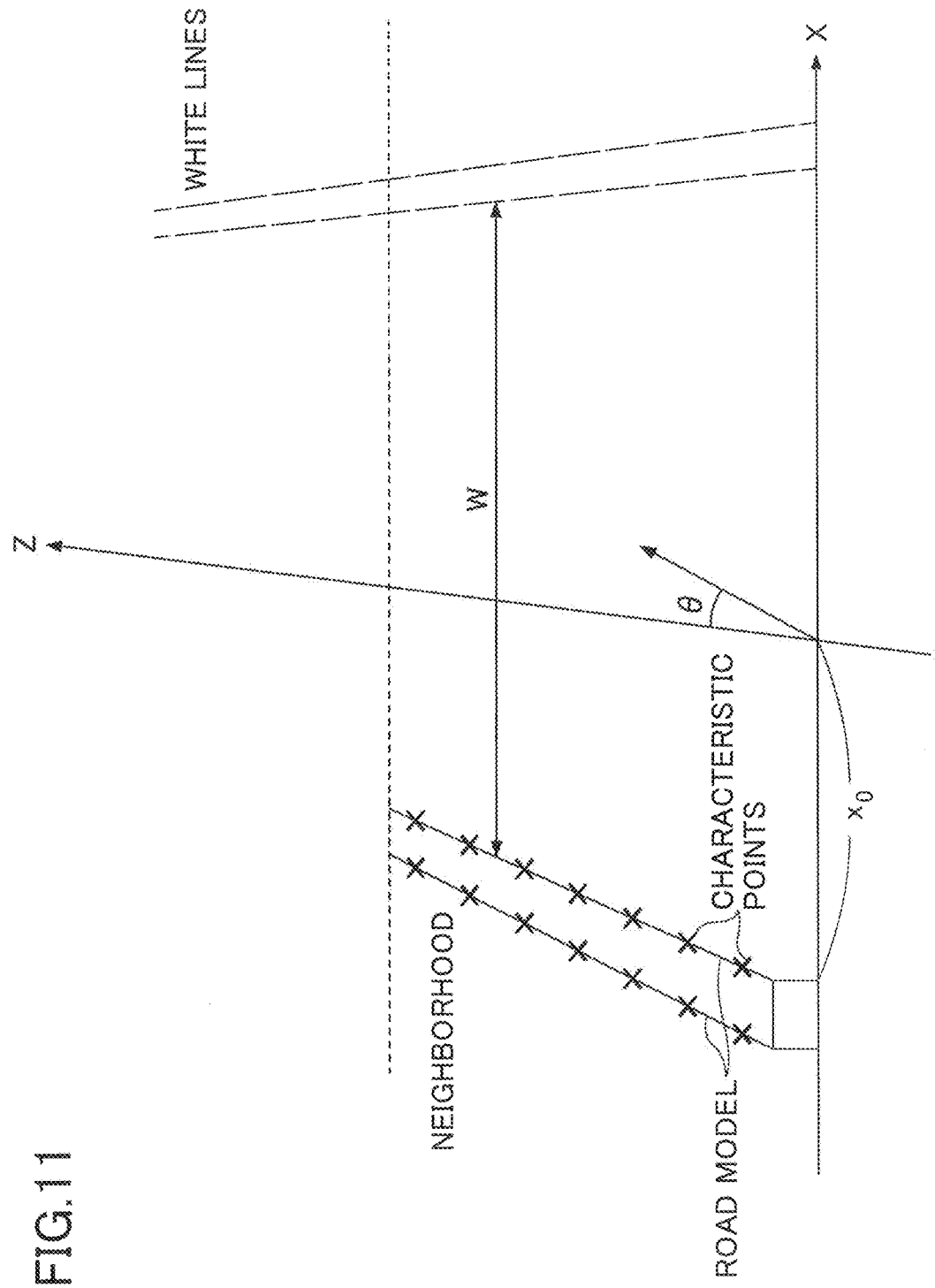
FIG. 11 is an example of a diagram illustrating estimation of roadway parameters.

FIG. 11 is an example of a diagram illustrating estimation of roadway parameters. For example, in case of a sidewalk step, two characteristic points are detected for each horizontal scanning line. From these characteristic points, the roadway parameter estimation unit 28 estimates coefficients of the road model. There are several methods to estimate the coefficients. For example, there is a method that uses a formula of the road model, substitutes coordinates of multiple characteristic points in the formula, and identifies the coefficient of the road model by the least squares method that uses a maximum likelihood method such as a Kalman filter or a particle filter to estimate the coefficients. Once the coefficients are obtained, the roadway parameters are obtained based on the road model.

A road model is defined, for example, as follows.

$$X = X_0 + \theta \times Z + 0.5 \times c \times Z^2 \quad (2)$$

where $X_0$ is the distance from the origin on the XZ plane to the characteristic point at Z=zero. $\theta$ is an angle formed between the optical axis of the right camera 11 or left camera 12, and a curbstone or a sidewalk step (yaw angle of the vehicle). $\theta$ takes a positive value in the right direction relative to the forward direction. The parameter c is the curvature of the road, which is negative for a left curve, or positive for a right curve by the definition of the XZ plane. In Formula (2), a shift by the yaw angle is corrected relative to $X_0$ as a reference point (if the vehicle has the yaw angle in the right direction, a white line is captured having a slope in the left direction, which is corrected), and the curvature c is built into the formula multiplied by the square of z.

The roadway parameter estimation unit 28 substitutes coordinates (X, Z) of the characteristic point on the XZ plane in Formula (2), to obtain $\theta$ and c by the least squares method. In this way, among the roadway parameters, the yaw angle $\theta$ and the curvature c (radius R) of the road can be obtained. Also, the width W is obtained from a distance between a white line on the left side (if there is a white line, otherwise, a characteristic point of a curbstone or the like on the left side), and a white line of the right side (if there is a white line, otherwise, a characteristic point of a curbstone or the like on the right side) at an arbitrary Z coordinate. The position of the vehicle in a lane can be represented by, for example, $W/2-X_0$ by setting the center position of the lane to zero (reference). In this way, the roadway parameters can be obtained from a curbstone or a sidewalk step.

<S80 Setting Search Range>

The search range setting unit 29 sets a search range of edges using the road model having the coefficients determined. The search range of edges is an image processing range where edges of a curbstone or a sidewalk step in a far-off region are searched for.

Figure 12:
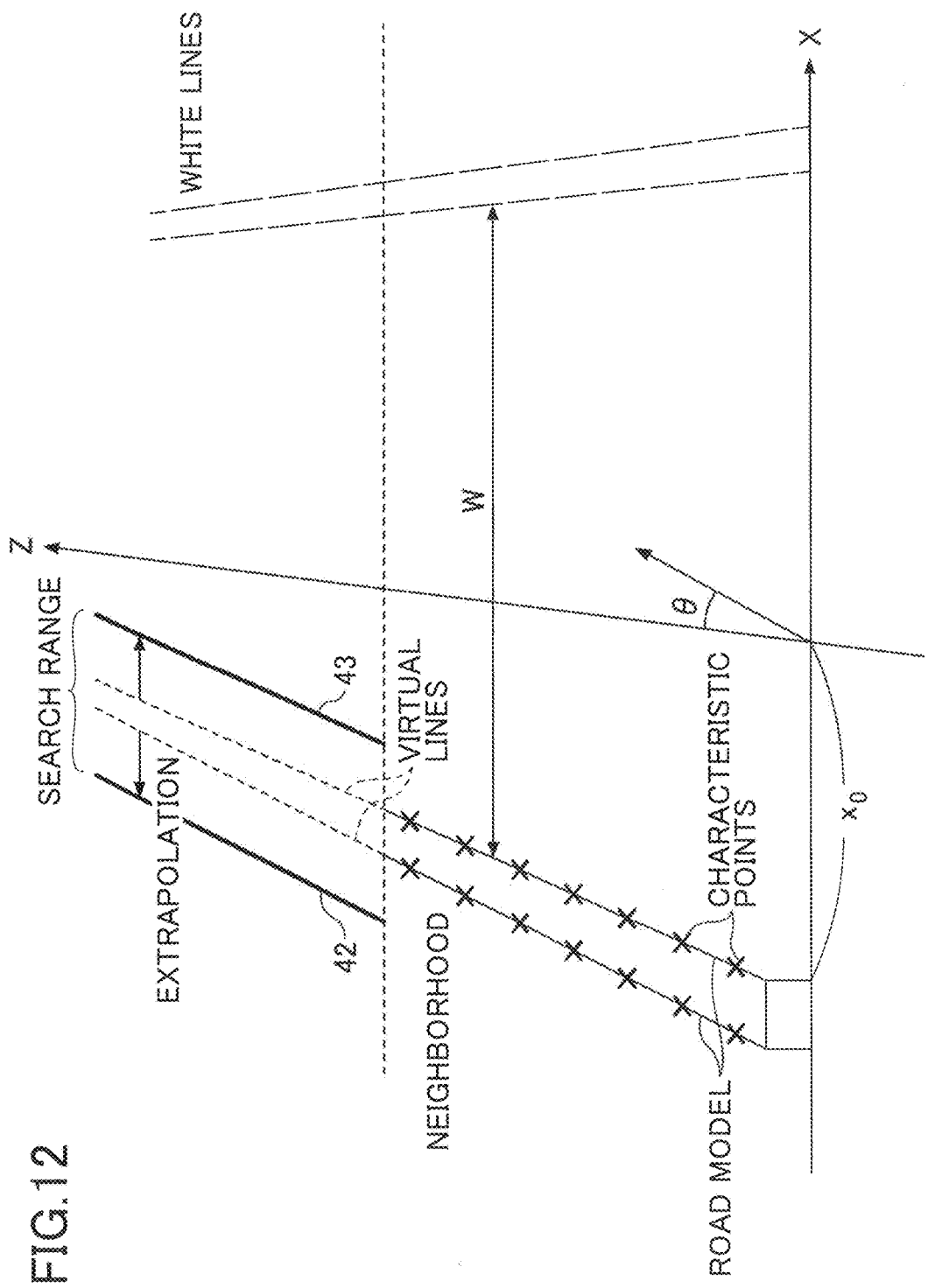
FIG. 12 is an example of a diagram illustrating setting of a search range.

FIG. 12 is an example of a diagram illustrating setting of a search range. The roadway parameters have been determined for the predetermined road model using characteristic points in the neighboring region by the roadway parameter estimation unit 28. The search range setting unit 29 first calculates X at an arbitrary Z in the far-off region using the determined roadway parameters. Thus, a virtual line 41 is obtained by extrapolating the characteristic points of the curbstone or the sidewalk step in the far-off region.

The search range setting unit 29 sets the search range by translating the virtual line by a predetermined distance symmetrically or non-symmetrically. The virtual line 41 comes into existence between two lines. For example, on a straight road, two search range lines 42 and 43 are set by translating the virtual line 41 in both positive and negative sides in the X axis direction (leftward and rightward) by a predetermined distance, respectively. The search range of edges is the range between the search range line 43 on the positive side and the search range line 42 on the negative side.

Also, if the road has a curve in the forward direction, and the curbstone or the like has a slope relative to the y axis direction in the image, two search range lines 42 and 43 are set by translating the virtual line 41 in both obliquely upward and obliquely downward directions relative to the virtual line 41 by a predetermined distance, respectively. Also, if the road has a curve in the forward direction, and the curbstone or the like is captured virtually parallel to the x axis direction of the image, the search range is set by translating the virtual line 41 in both upward and downward directions relative to the virtual line 41 by a predetermined distance, respectively. Note that the distance between the virtual line 41 and the search range line 42 may be or may not be equal to the distance between the virtual line 41 and the search range line 43, namely, the distances may be symmetric or non-symmetric.

Two virtual lines 41 are obtained from the characteristic points for a sidewalk step, whereas three virtual lines 41 are obtained for a curbstone. Therefore, if a search range is set for each virtual line of the characteristic points, line segments twice as many as the number of virtual lines are set for setting the search ranges.

Also, the search range setting unit 29 may set a search range line 43 for a virtual line 41 having the greatest X value, in a direction toward which the X value gets greater, and may set a search range line 42 for a virtual line 41 having the least X value, in a direction toward which the X value gets less. This makes it possible to set just two search range lines 42 and 43 for setting a search range even if multiple virtual lines 41 are detected, for example, three lines for the characteristic points of a curbstone.

\<S90 Detection of Edge Line Segments\>

The edge segment detection unit 30 detects edge line segments in a search range. As edges have been already extracted by the edge extraction unit, edges in the search range has also been detected. These edges include an edge continuous with a characteristic part of the neighboring region. The edge segment detection unit 30 detects such an edge line segment that is continuous with the characteristic part of the neighboring region.

Figure 13:
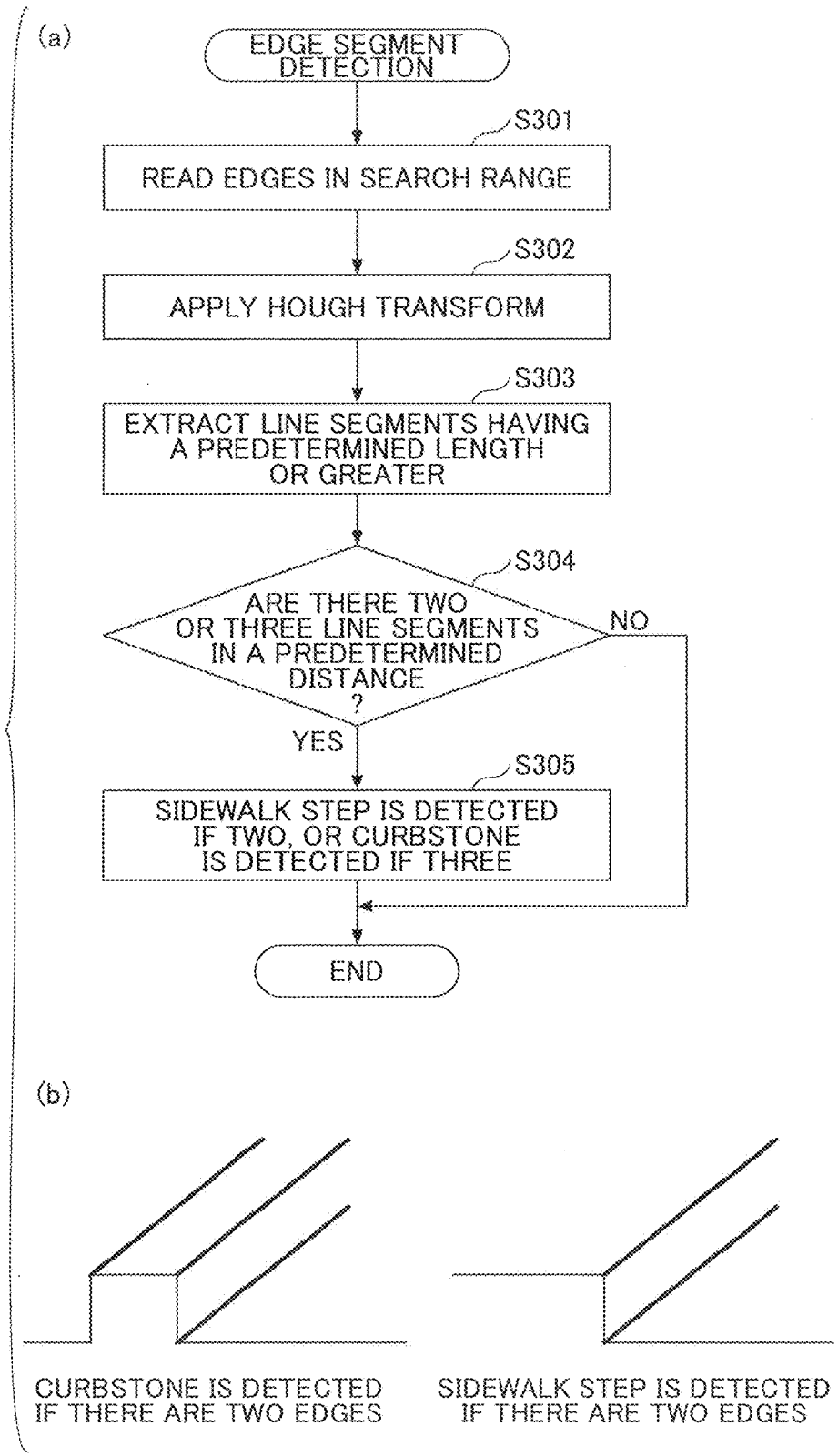
FIG. 13 includes an example of a flowchart illustrating steps to detect edge line segments by an edge segment detection unit.

FIG. 13(*a*) is an example of a flowchart illustrating steps to detect edge line segments by the edge segment detection unit 30.

First, the edge segment detection unit 30 reads edges in the search range (Step S301).

The edge segment detection unit 30 applies Hough transform to the edges (Step S302). It is preferable to use a probabilistic Hough transform because the objective of the Hough transform is to detect line segments. A line segment detected by the probabilistic Hough transform has an endpoint, and only one line segment passes through the endpoint. Note that a line segment may not be detected by the Hough transform. Instead, a line segment may be detected by, for example, obtaining a linear function for an edge passing through two points, and identifying another edge on the linear function.

Next, the edge segment detection unit 30 extracts line segments having a predetermined length or greater (Step S303). A line segment having a predetermined length or greater has a length to cover the far-off region to a certain extent (for example, 10 to 30 m). An edge line segment may be intercepted in the Z direction. In this case, the total length of the multiple edge line segments on a line in Z direction (having the same slope and intercept) may be greater than or equal to the predetermined length.

The edge segment detection unit 30 determines whether there are two or three line segments having the predetermined length or greater within a predetermined distance in the horizontal direction (X-direction) (Step S304). Also, a condition may be added that the line segments having the predetermined length or greater are nearly parallel to each other. In this case, the predetermined length may be set to, for example, several dozens of cm (50 to 100 cm), to cover a range where characteristic points of a curbstone or a sidewalk step are included.

FIG. 13(*b*) is an example of a diagram illustrating the number of line segments having the predetermined length or greater, and determination of a curbstone or a sidewalk step. If there are two line segments, it is highly likely that the characteristic points are of a sidewalk step. If there are three, it is highly likely that the characteristic points are of a curbstone. Thus, it is possible to detect a curbstone or a sidewalk step in the far-off region.

Therefore, the edge segment detection unit 30 detects a sidewalk step when it detects two edge line segments, or it detects a curbstone when it detects three edge line segments (Step S305).

Note that if there is only one line segment having the predetermined length or greater, it may be determined as the characteristic points of a curbstone or a sidewalk step. However, to avoid erroneous detection, it is preferable to add a condition. For example, it may be determined as the characteristic points of a curbstone or a sidewalk step if and only if the slope of the characteristic points in the neighboring region coincides with the slope of the line segment having the predetermined length or greater.

Also, if there are four or more line segments having the predetermined length or greater, the number of the characteristic points in the neighboring region can be used to narrow the line segments to be obtained. For example, if there are three characteristic points in the neighboring region, among the line segments having the predetermined length or greater, a line segment is excluded that has a slope most different from the others, or has a most remote position from the characteristic points of the neighboring region on the boundary between the neighboring region and the far-off region.

In this way, a curbstone or a sidewalk step in the far-off region is detected to determine the roadway parameters in the far-off region. Therefore, for example, even if a white line in the far-off region is not detected, the roadway parameters of the far-off region can be determined, and the drive support ECU can execute a drive support based on the roadway parameters.

As described above, the roadside object detection apparatus 100 in the present embodiment can detect a step using highly precise parallax information in a neighboring region, and can improve detection precision of a curbstone or a sidewalk step in a far-off region by extrapolating the characteristic points of the step in the far-off region.

Second Embodiment

In the first embodiment, a curbstone or a sidewalk step is detected by detecting line segments from edges in a search range. In a second embodiment, a roadside object detection apparatus 100 will be described that detects a curbstone or a sidewalk step by applying template matching to a region where characteristic points are extrapolated.

Figure 14:
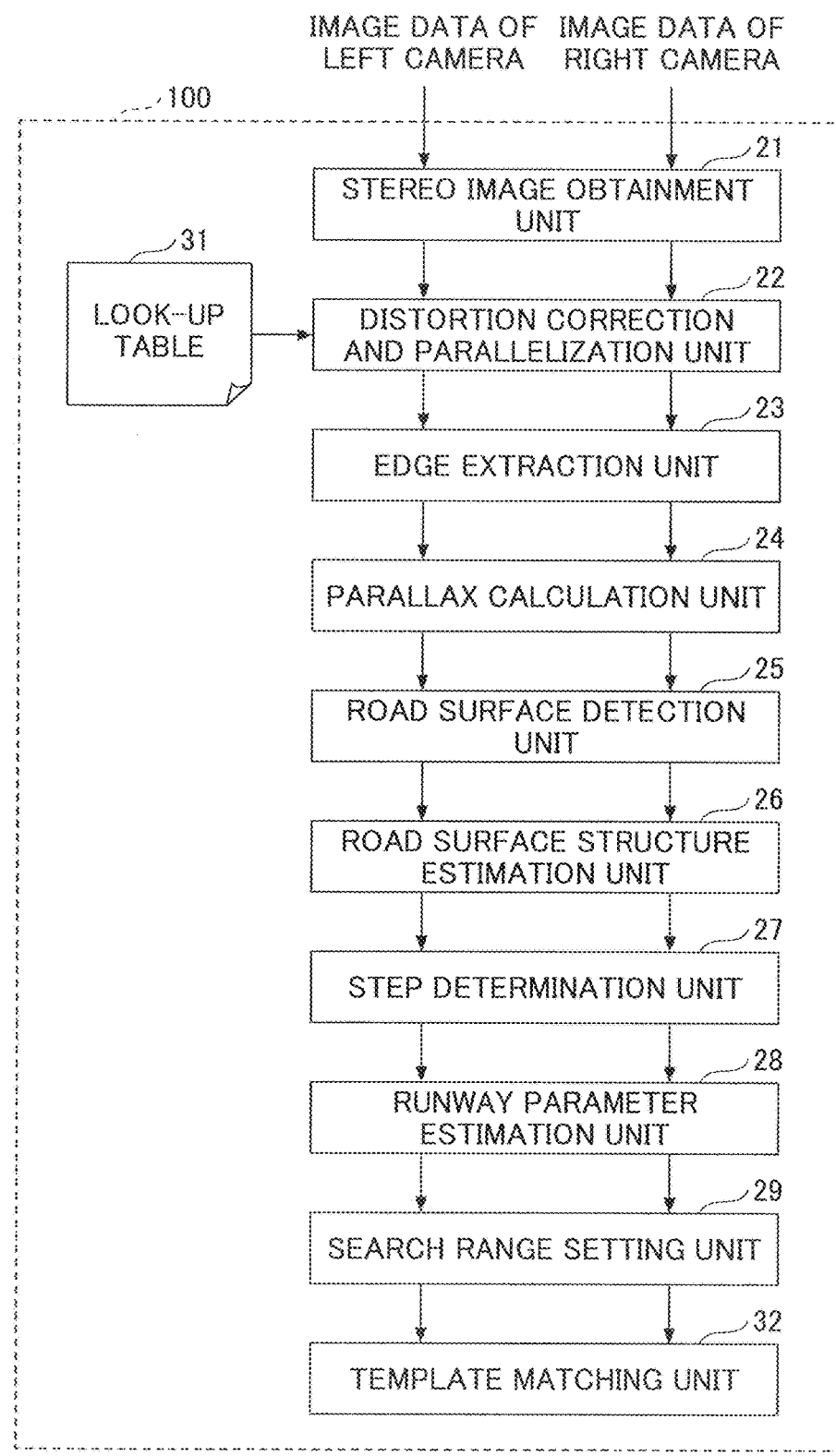
FIG. 14 is an example of a functional block diagram of a camera computer according to a second embodiment.

FIG. 14 is an example of a functional block diagram of a camera computer according to the present embodiment. Only main parts in FIG. 14 will be described, and the functions already described earlier may be omitted. A camera computer 13 in FIG. 14 includes a template matching unit 32. The template matching unit 32 creates a template image from an image of a curbstone in a neighboring region, and executes template matching with an image in the search range.

Figure 15:
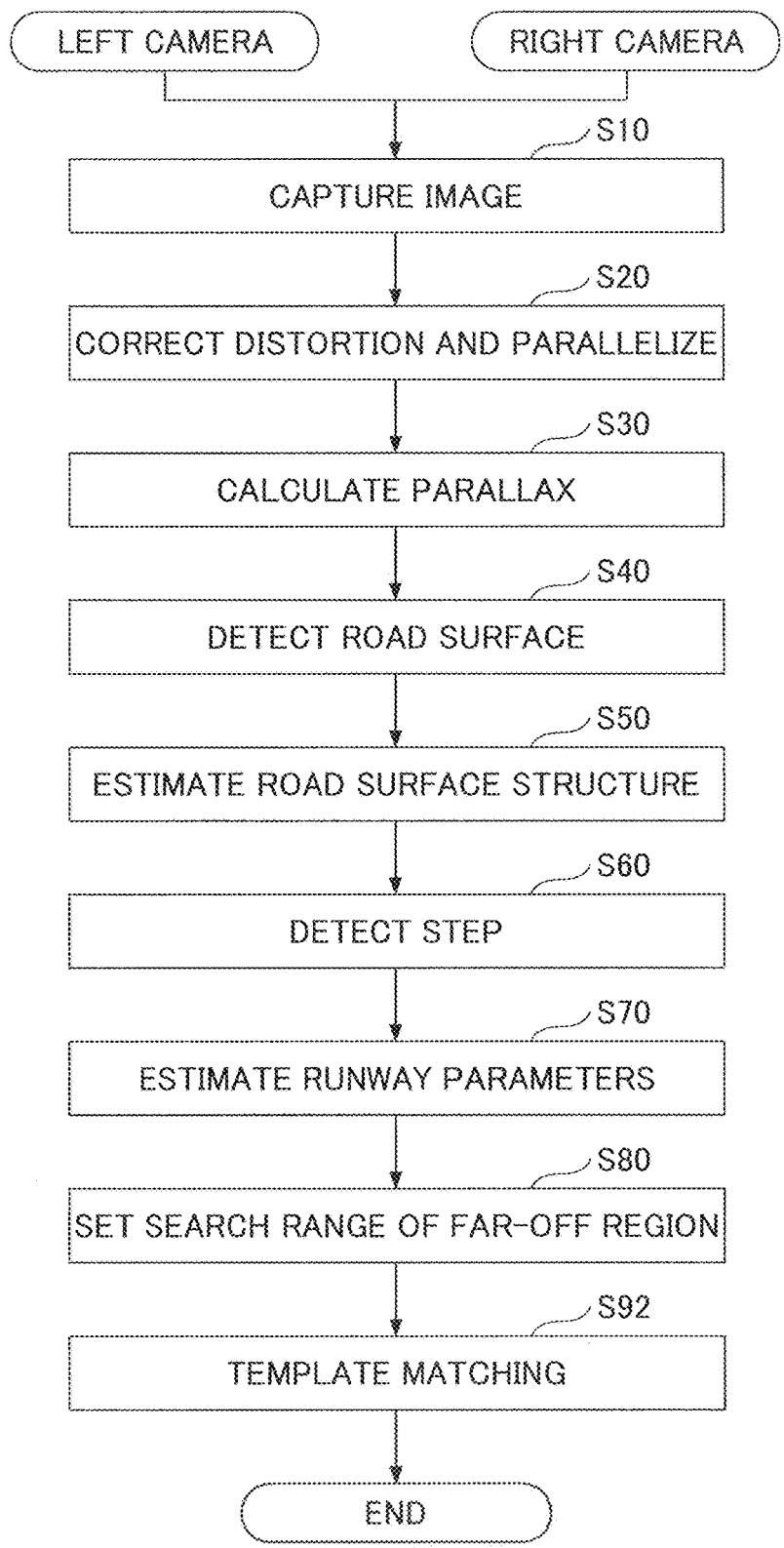
FIG. 15 is an example of a flowchart illustrating steps executed by the roadside object detection apparatus to detect a curbstone or a sidewalk step in an image according to the second embodiment.

FIG. 15 is an example of a flowchart illustrating steps executed by the roadside object detection apparatus 100 to detect a curbstone or a sidewalk step in an image. In FIG. 15, Step S90 in the first embodiment is replaced by Step S92, or a step for template matching.

\<S92 Template Matching\>

Figure 16:
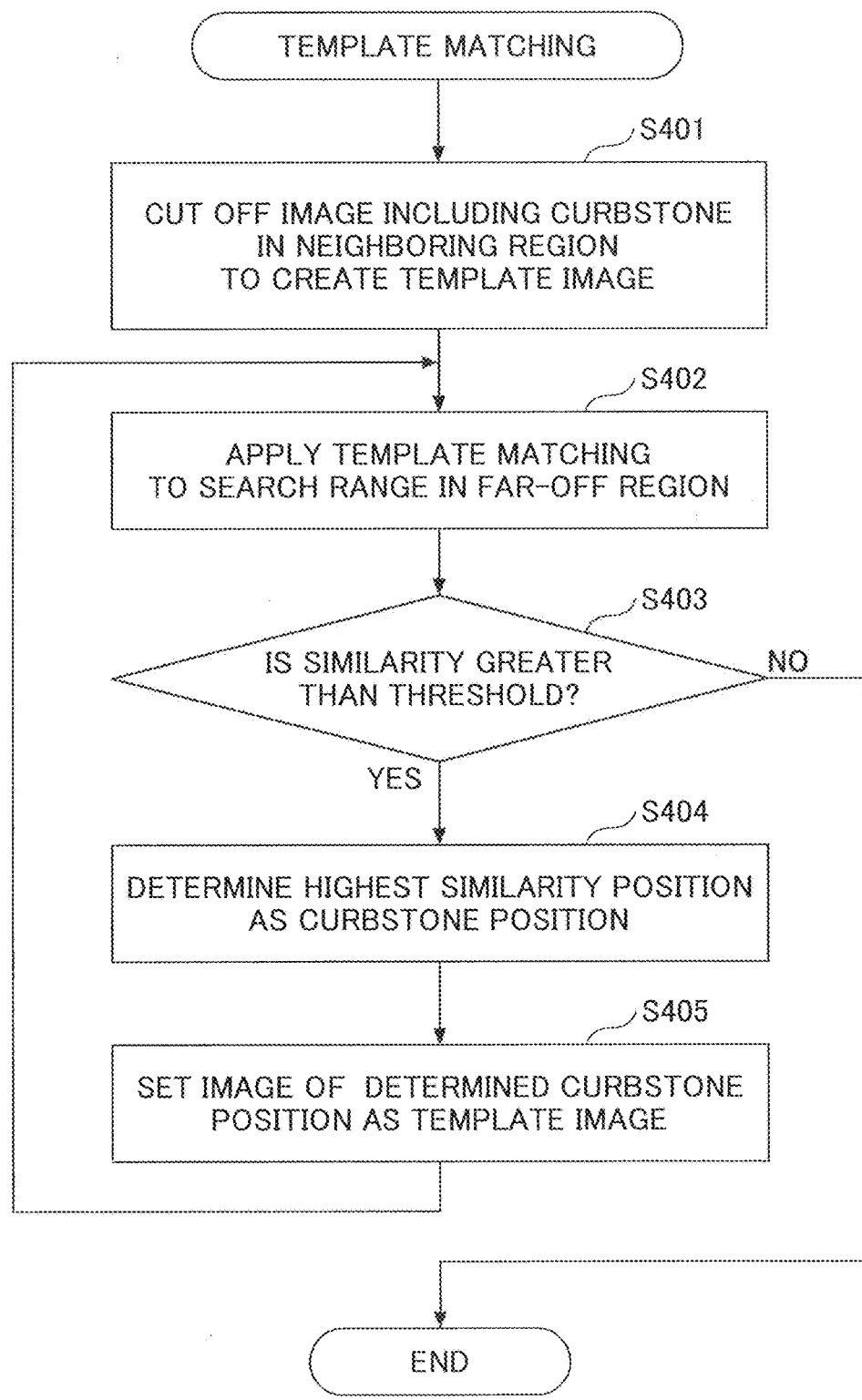
FIG. 16 is an example of a flowchart illustrating a process of template matching.
Figure 17:
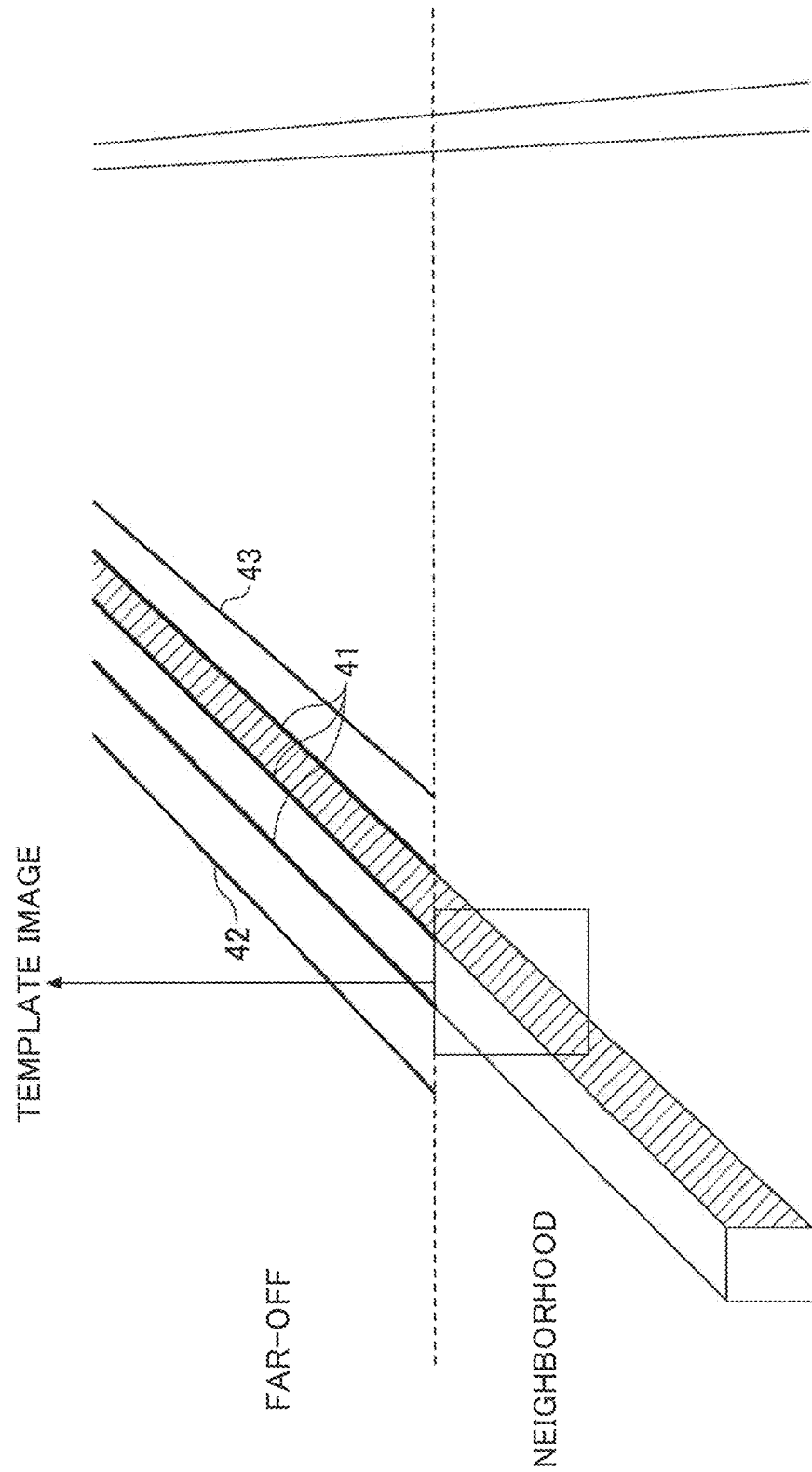
FIG. 17 is an example of a diagram illustrating template matching.

FIG. 16 is an example of a flowchart illustrating a process of template matching, and FIG. 17 is an example of a diagram illustrating template matching.

The template matching unit 32 creates a template image by cutting off an image (brightness image) including a curbstone in the neighboring region (Step S401). It is preferable to cut off a range including, at least, a side surface part of a curbstone. Note that a curbstone has a characteristic point on the sidewalk side, which is different from a sidewalk step. Therefore, it is preferable to cut off a range including the characteristic points. Since these characteristic points can be obviously identified as in FIGS. 10*b*-10C, the template matching unit 32 can cut off a template image having an optimum size. On the other hand, it is less required for a sidewalk step to change the size of the image to be cut off, thus, the same size can be used regardless of a sidewalk step or a curbstone. For example, the lateral size of a template image is set twice the interval between the characteristic points B and D, and the longitudinal size is set to the same or less.

It is preferable to have the template matching unit 32 cut off a template image in a region most away from the vehicle in the neighboring region. This is because the template image cut in this way is likely to be analogous to a curbstone or a sidewalk step in the far-off region.

Note that, if the neighboring region is fixed when cutting off a template image in a region most away from the vehicle, the size of a template image can be determined beforehand without determining an image to be cut off based on the characteristic points because the size of the template image is about the same.

Also, although the template image is assumed to be a brightness image, the template image may be cut off from an edge image.

Next, the template matching unit 32 applies template matching to an image in the search range in the far-off region, having a virtual line 41 obtained by extrapolation of the road model at the center (Step S402). The virtual line 41 is highly likely to be positioned on or around characteristic points of a curbstone or a sidewalk step in the far-off region. Thereupon, the template matching unit 32 applies template matching to the image with the template image centered on the virtual line 41 in the far-off region. The virtual line 41 is converted into the plane coordinate system because template matching is executed for images. Note that template matching is started at a part having a less distance to the vehicle in the search range. For example, the search range is partitioned into several groups along a direction going far, to execute template matching by units of groups.

The template matching unit 32 calculates similarity every time a pixel in a group is shifted for search. The similarity is, for example, the reciprocal of an SAD or an SSD.

Next, the template matching unit 32 identifies a maximum similarity within the search range in the group, and determines whether the value is greater than or equal to a threshold (Step S403).

If the similarity is greater than or equal to the threshold (YES at Step S403), the template matching unit 32 determines that a curbstone exists at a position in the template image where the best similarity is obtained (Step S404). As the template image includes characteristic points, the image in the search region that has the same size as the template image is presumed to include the characteristic points at the corresponding pixels. Alternatively, the positions of the characteristic points may be identified by detecting edges in the image in the search region that has the same size as the template image.

The template matching unit 32 sets a new template image by cutting off an image that has been determined to include a curbstone (Step S405).

The template matching unit 32 repeats Steps S20 and after for a next group region in the search range, using the new template image. In the far-off region, the template image may be set to have a smaller size by deleting outer edges of the template image because a curbstone or a sidewalk step gets gradually smaller.

In this way, identification of a far-off curbstone or a sidewalk step is repeated while switching the template image and identifying the position of the curbstone or sidewalk step in the far-off region. Therefore, an image similar to the curbstone or sidewalk step to be detected can be set as the template image. Therefore, detection precision can be improved for a curbstone or a sidewalk step in a far-off region.

Third Embodiment

In a third embodiment, a roadside object detection apparatus 100 will be described that detects a curbstone or a sidewalk step in a far-off region using a white line.

Figure 18:
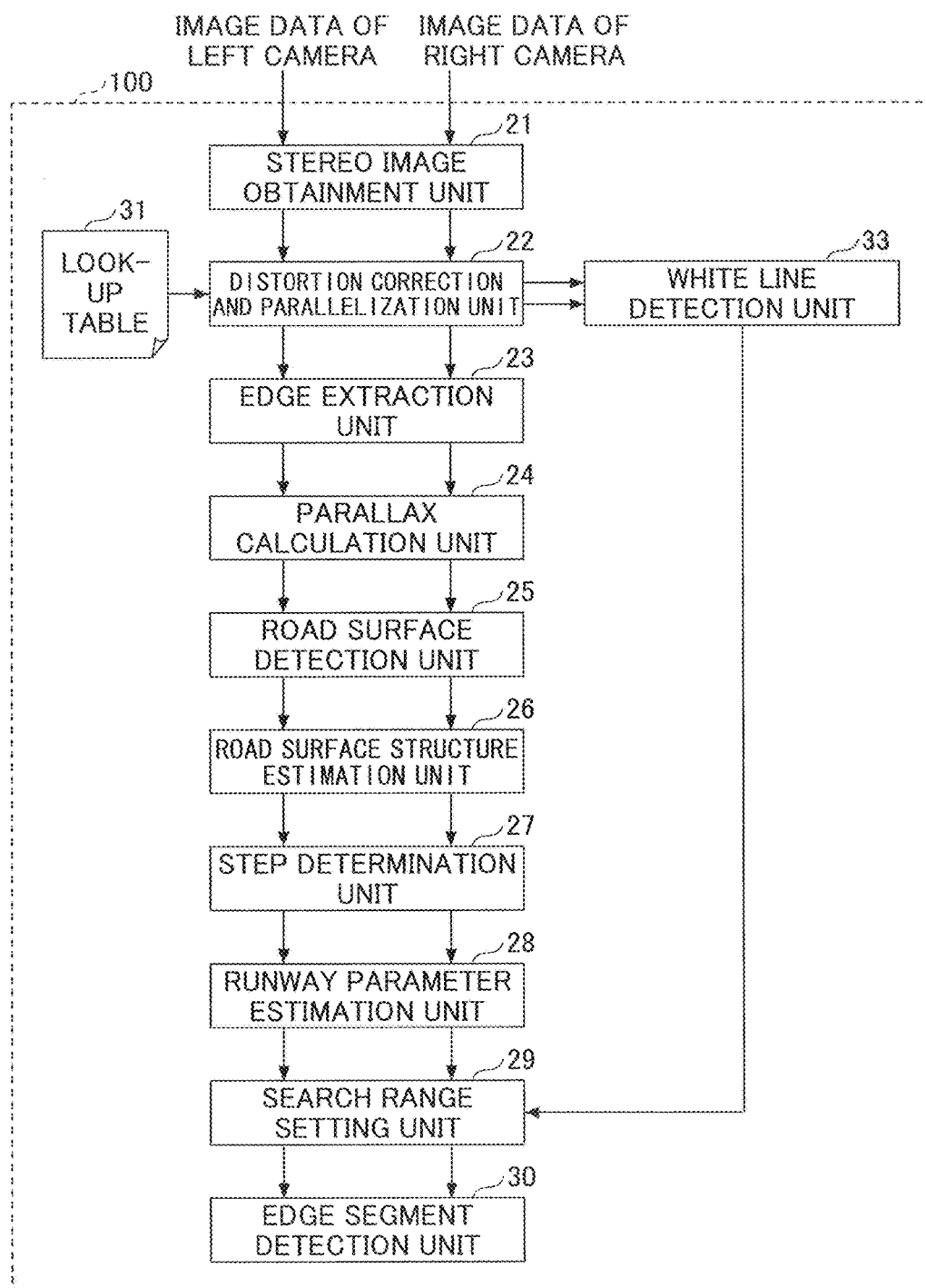
FIG. 18 is an example of a functional block diagram of a camera computer according to a third embodiment.

FIG. 18 is an example of a functional block diagram of a camera computer 13 according to the present embodiment. Only main parts in FIG. 18 will be described, and the functions already described earlier may be omitted. A camera computer 13 in FIG. 18 includes a white line detection unit 33. The white line detection unit 33 detects a white line on the side of a curbstone or a sidewalk step in a range captured by the camera computer 13. Therefore, the image may capture one of a white line on the side of a curbstone or a sidewalk step on the left side in the traveling direction, and a white line on the side of a curbstone or a sidewalk step on the right side, or white lines on the sides of curbstones or sidewalk steps on both left and right sides, respectively.

Also, an edge segment detection unit 30 in the present embodiment detects edge line segments as done by the edge segment detection unit 30 also included in the camera computer in the first embodiment. In addition, the edge segment detection unit 30 in the present embodiment evaluates parallelism between an edge line segment and a white line, and a distance to the white line to identify edge line segments formed by characteristic points of a curbstone or a sidewalk step.

Figure 19:
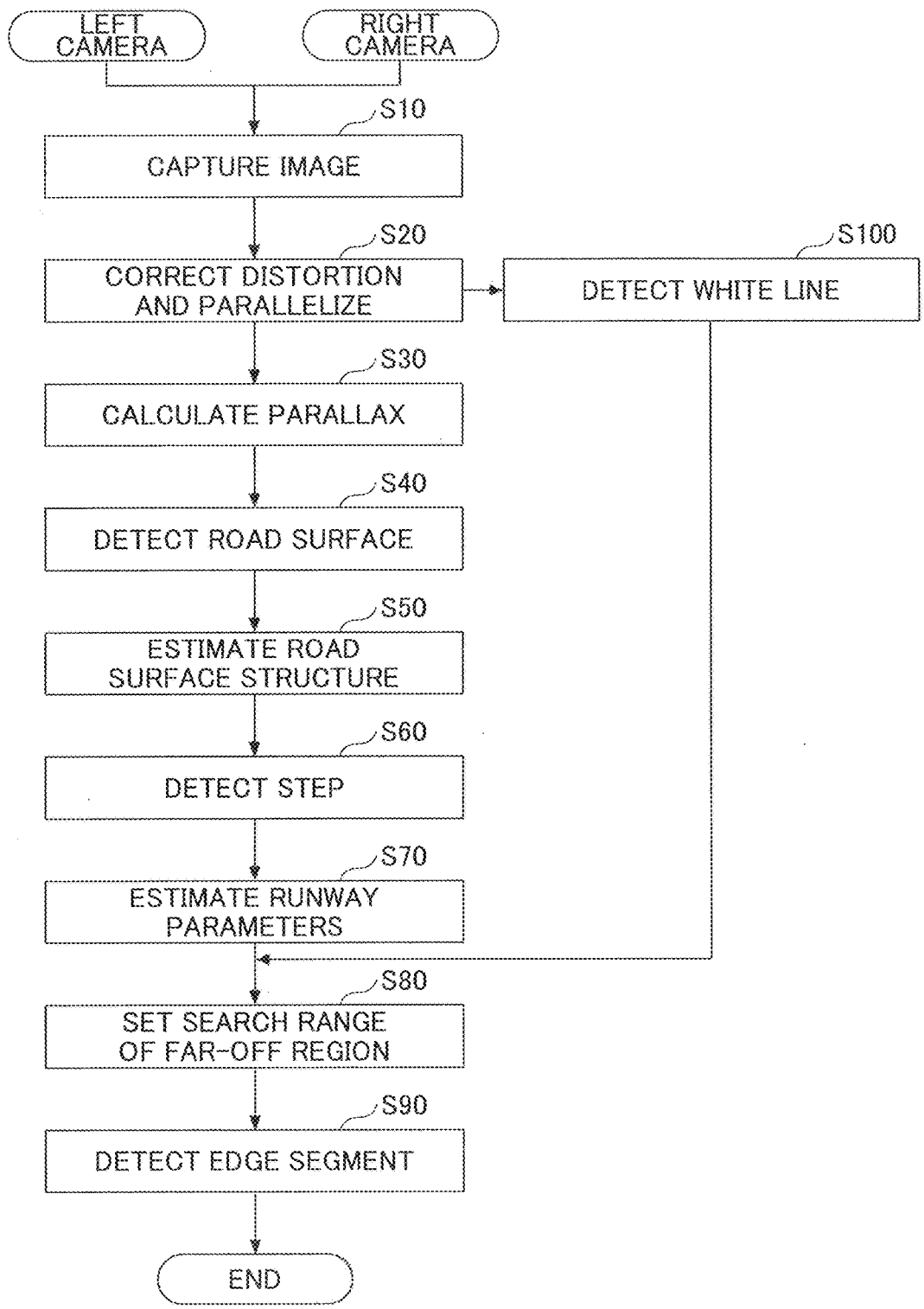
FIG. 19 is an example of a flowchart illustrating steps executed by a roadside object detection apparatus to detect a curbstone or the sidewalk step in an image according to the third embodiment.

FIG. 19 is an example of a flowchart illustrating steps executed by the roadside object detection apparatus 100 to detect a curbstone or the sidewalk step in an image. In FIG. 19, Step S100 for white line detection is newly added. Also, Steps S80 and S90 differ from those in the first embodiment because a white line is used.

<S100 White Line Detection>

The white line detection unit 33 detects a white line in an image captured by a right camera 11 or a left camera 12. When using a stereo camera, a white line may be detected in one of the images captured by the cameras, or a white line may be detected in a common region of the images taken by the right camera 11 and the left camera 12.

Figure 20:
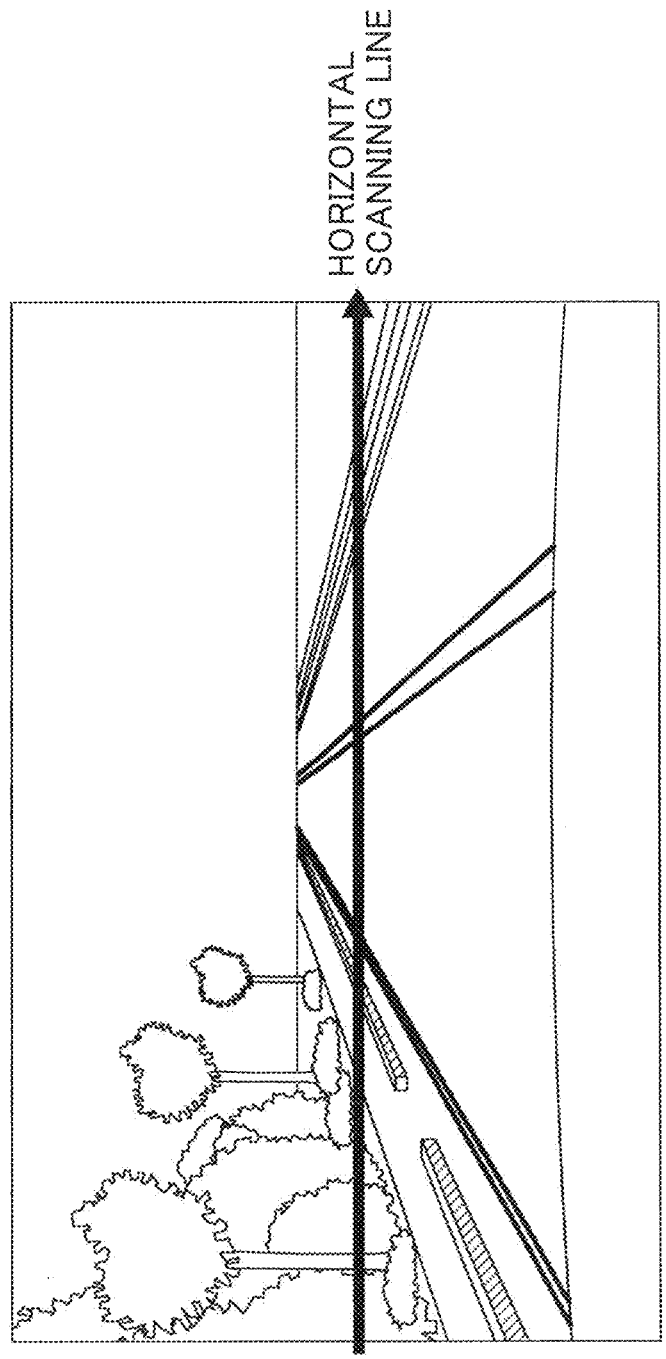
FIG. 20 is an example of a diagram schematically illustrating detection of white lines.

FIG. 20 is an example of a diagram schematically illustrating detection of white lines. The white line detection unit 33 detects white lines from an edge image or a brightness image. FIG. 20 schematically illustrates image data (white lines in the plane coordinate system). The white line detection unit 33 identifies pixels having edge strengths greater than or equal to a threshold for edges extracted by the edge extraction unit 23. In FIG. 20, edges are obtained for left and right white lines, respectively. On the edges, the brightness is changed from that of the road to that of the white line, or changed from that of the white line to that of the road. Note that a region for detecting white lines may be restricted to a right side part and a left side part of an image, assuming that no white lines are around the center. This reduces a process load of the camera computer 13.

The white line detection unit 33 searches pixels having edge strengths greater than or equal to the threshold in the image from bottom to top. Even if white lines are straight lines, they are captured as lines having the interval greater at the bottom than at the top in the image. Multiple edges that have been searched for are extended to repeat the search. If white lines exist, edges are obtained for the left and right white lines in the direction from bottom to top in the image, respectively. Such an edge is detected as a continuous line if a solid white line is favorably captured, or detected as a line having intervals if it is a set of points or a dashed line.

The white line detection unit 33 determines whether an edge is detected almost continuously, or if not, determines whether the intervals between the edges are the same length to determine whether the edges can be estimated as a part of a white line. If the edges are estimated as a part of a white line, the width of the edges is compared with the width of a general white line, for two left and right edge lines, respectively, to exclude a non-real white line for detecting real white lines in the left and right, respectively. The white line detection unit 33 can represent white line edges on the XZ plane using a correspondence formula between the road coordinate system and the plane coordinate system.

Note that white lines do not necessarily exist in the left and right in the traveling direction, but only one white line may be detected. In the present embodiment, at least a white line is detected on the side of a curbstone or a sidewalk step. For example, a white line on the left side in the traveling direction is detected in a country where the rule is to keep to the left, whereas a white line on the right side is detected in a country where the rule is to keep to the right. Also, if the road is narrow and has curbstones on the left and right, either one of the white lines may be detected to obtain the same effect according to the present embodiment. Therefore, either one of the white lines on the left and right in the traveling direction may be detected, and if both left and right white lines are detected, a white line closest to the vehicle position is used for setting the search range.

<S80 Setting Search Range>

Figure 21:
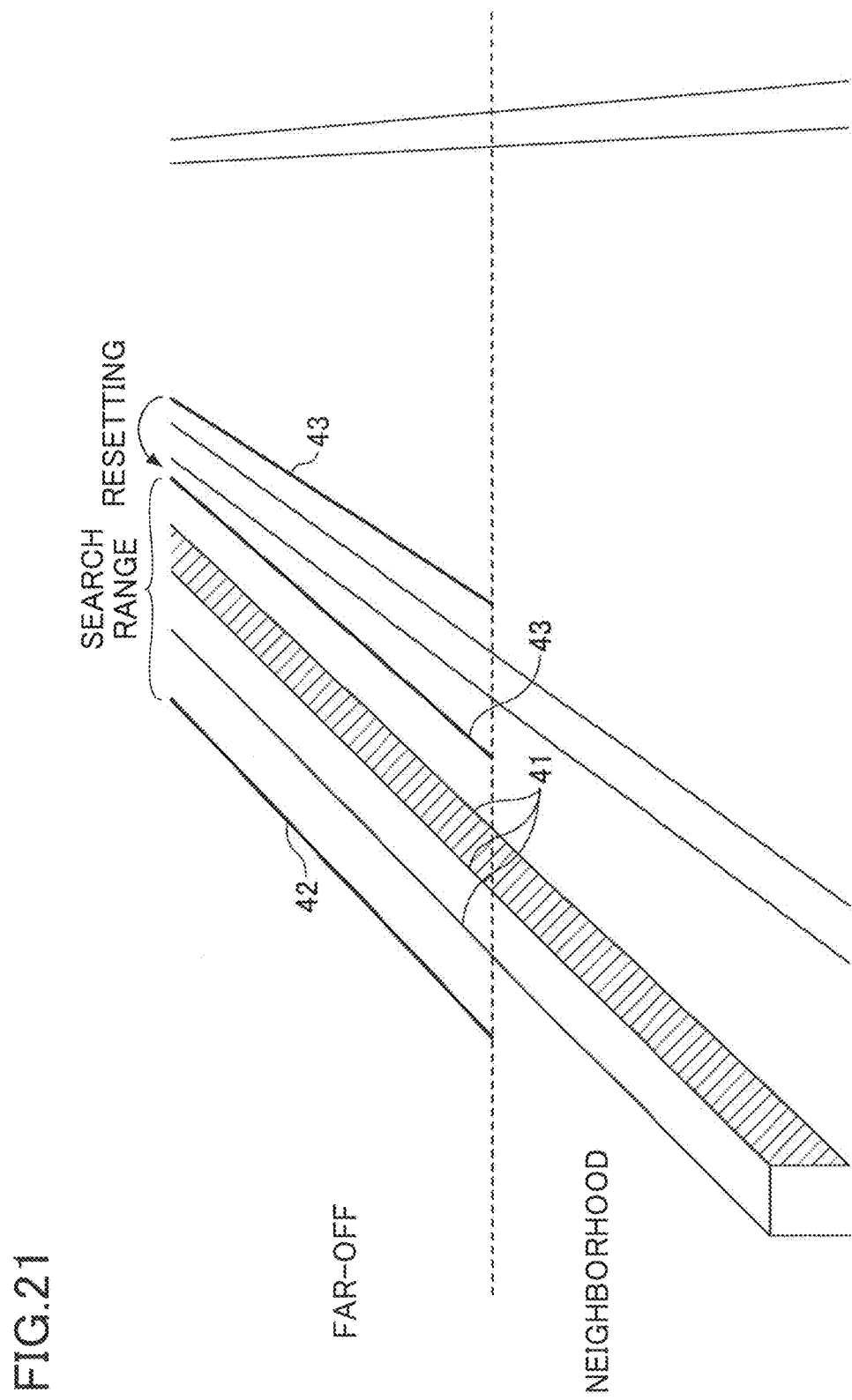
FIG. 21 is an example of a diagram illustrating setting of a search range by a search range setting unit.

FIG. 21 is an example of a diagram illustrating setting of the search range by the search range setting unit 29. A white line is marked on the roadway side of a curbstone. The curbstone or sidewalk step should be positioned on the sidewalk side of the white line.

The search range setting unit 29 sets search range lines 42 and 43 by translating extrapolated virtual lines 41. At this moment, the search range is reset (corrected) so that the search range line 43 does not go beyond the white line. For example, the search range line 43 on the roadway side may be translated to be positioned on the sidewalk side of the white line (between the virtual line and the white line, and separated from the virtual line). This makes it possible to narrow the search range while including the curbstone or sidewalk step, and to shorten time to detect edge line segments.

<S90 Detection of Edge Line Segments>

The edge segment detection unit 30 detects edge line segments in the search range, compares the edge line segments with a white line, and narrows the edge line segments of the characteristic points of a curbstone or a sidewalk step.

Figure 22:
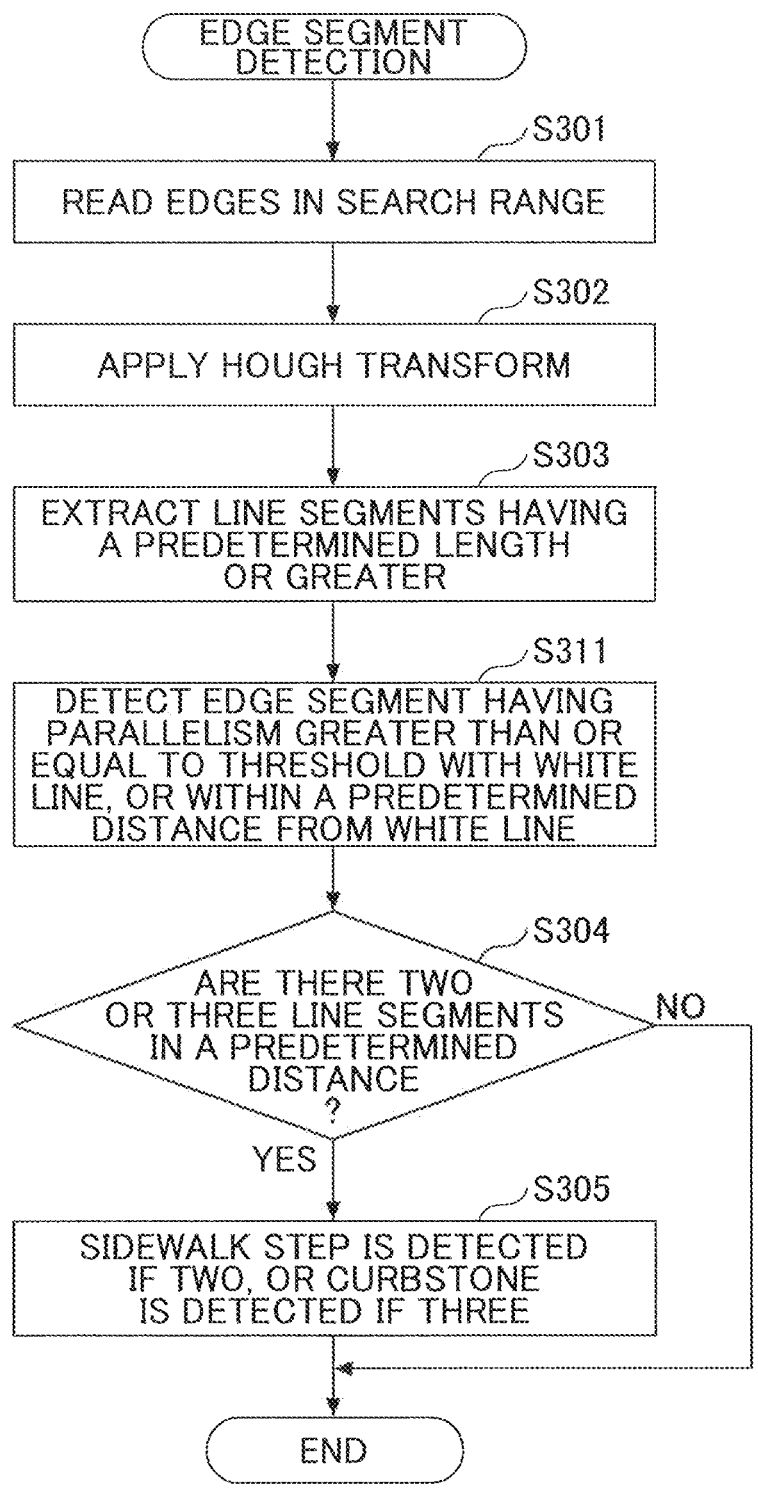
FIG. 22 is an example of a flowchart illustrating steps to detect edge line segments by an edge segment detection unit.

FIG. 22 is an example of a flowchart illustrating steps to detect edge line segments by the edge segment detection unit 30. In FIG. 22, Step S311 is newly added.

Among the line segments having the predetermined length or greater detected at Step S303, the edge segment detection unit 30 further extracts edge line segments that satisfy the following conditions (Step S311), the parallelism with the white line is greater than or equal to a threshold;

the distance to the white line is within a predetermined range.

To obtain the parallelism, the least squares method or the like is applied to the white line to represent it by a linear function. The parallelism can be identified by comparing the slope of the white line with that of the edge line segment because the edge line segment is a straight line. Also, the distance to the white line can be obtained by drawing a line from an arbitrary point on the edge line segment, perpendicular to the edge line segment, to obtain a cross point with the white line, and to obtain the distance between the points.

The threshold of parallelism may be set to, for example, 5 to 10 degrees. Also, the predetermined range where white lines are searched is set from the distance between a white line and a curbstone or a sidewalk step in a neighboring region. Namely, if the distance between a white line and a curbstone or a sidewalk step in a neighboring region is 50 cm, it is added with a margin to be set to, for example, 60 cm.

The edge segment detection unit 30 determines two or three edge line segments identified in this way as edge line segments formed by the characteristic points of a curbstone or a sidewalk step.

In this way, in the present embodiment, the roadside object detection apparatus 100 can improve detection precision of a curbstone or a sidewalk step in a far-off region using a white line on the side on the curbstone.

Fourth Embodiment

In a fourth embodiment, a roadside object detection apparatus 100 will be described that detects a curbstone or a sidewalk step in a far-off region using a preceding vehicle.

Figure 23:
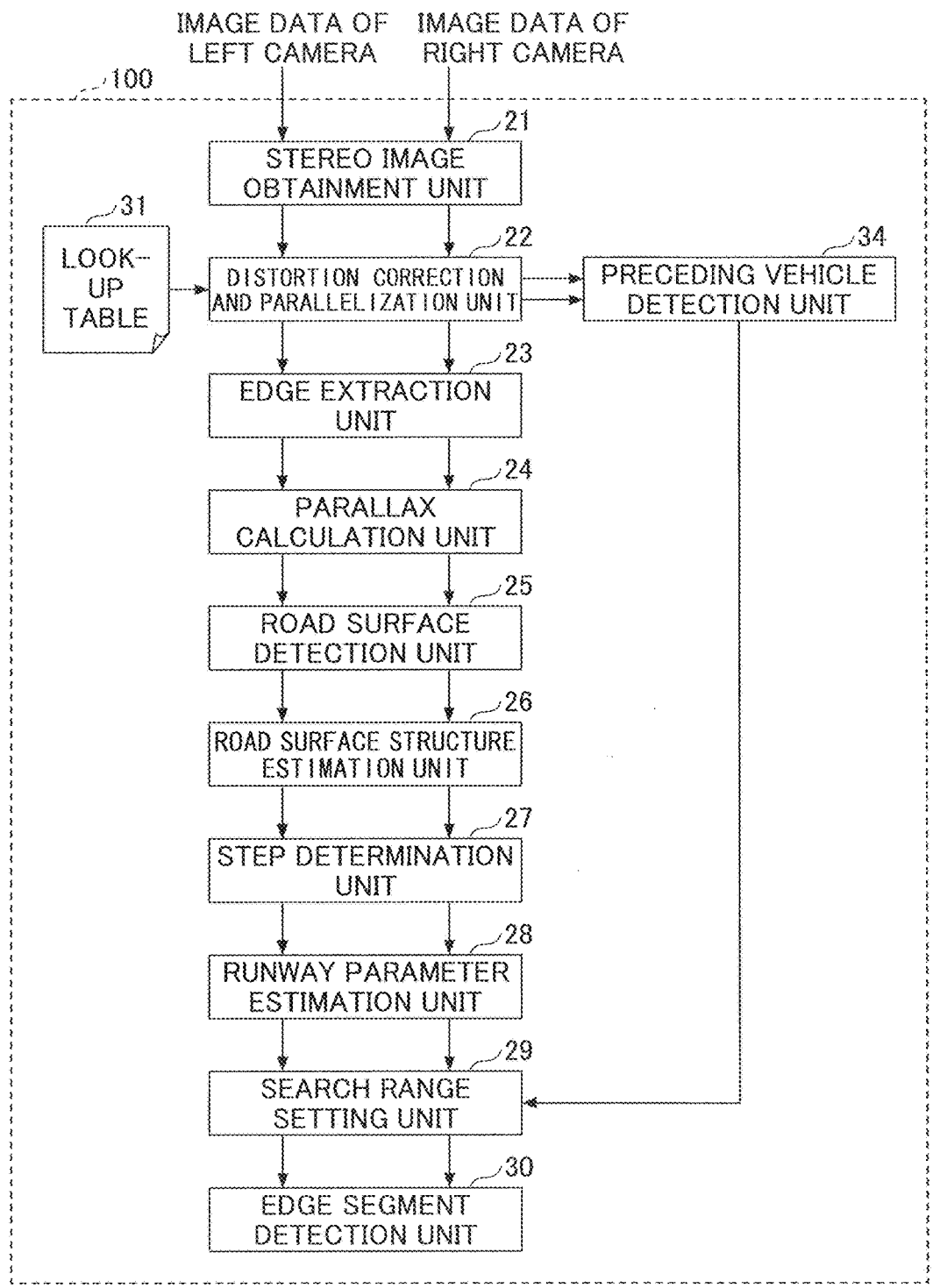
FIG. 23 is an example of a functional block diagram of a camera computer according to a fourth embodiment.

FIG. 23 is an example of a functional block diagram of a camera computer 13 according to the present embodiment. Only main parts in FIG. 23 will be described, and the functions already described earlier may be omitted. A camera computer 13 in FIG. 23 includes a preceding vehicle detection unit 34. The preceding vehicle detection unit 34 detects a preceding vehicle running ahead of the vehicle. Also, the search range setting unit 29 resets search range lines so that the search range comes on the sidewalk side of the preceding vehicle.

Figure 24:
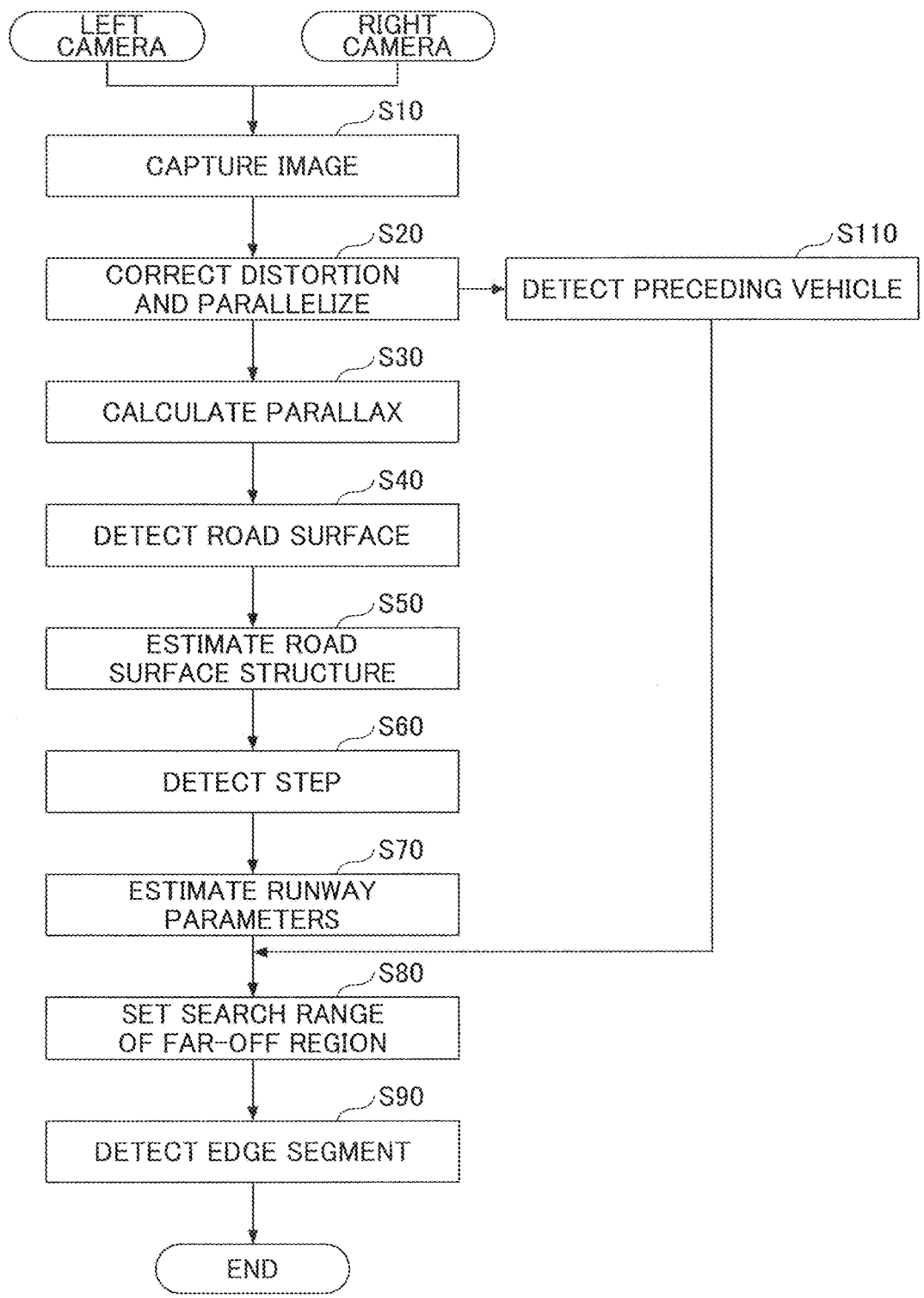
FIG. 24 is an example of a flowchart illustrating steps executed by a roadside object detection apparatus to detect a curbstone or the sidewalk step in an image according to the fourth embodiment.

FIG. 24 is an example of a flowchart illustrating steps executed by the roadside object detection apparatus 100 to detect a curbstone or the sidewalk step in an image. In FIG. 24, Step S110 for preceding vehicle detection is newly added. Also, Step S80 differs from that in the first embodiment because a preceding vehicle is used.

<S110 Preceding Vehicle Detection>

The preceding vehicle detection unit 34 detects a preceding vehicle in an image using a template provided beforehand. Also, an optical flow may be used. For example, several groups may be formed where pixel values are changed continuously in each of the groups, to estimate a group as a preceding vehicle if the group moves at speed greater than zero relative to the road surface, and positioned ahead of the vehicle. Also, although a preceding vehicle may be detected by a radar device using a millimeter wave or the like, the lateral position of a preceding vehicle is obtained with higher detection precision from an image in most cases.

The preceding vehicle detection unit 34 records the distance to a preceding vehicle associated with the lateral position. By detecting the distance, the preceding vehicle is confirmed whether running in the far-off region. Also, the preceding vehicle detection unit 34 records the distances and the lateral positions for several frames in the past. Thus, a trajectory of the preceding vehicle can be obtained.

<S80 Setting Search Range>

Figure 25:
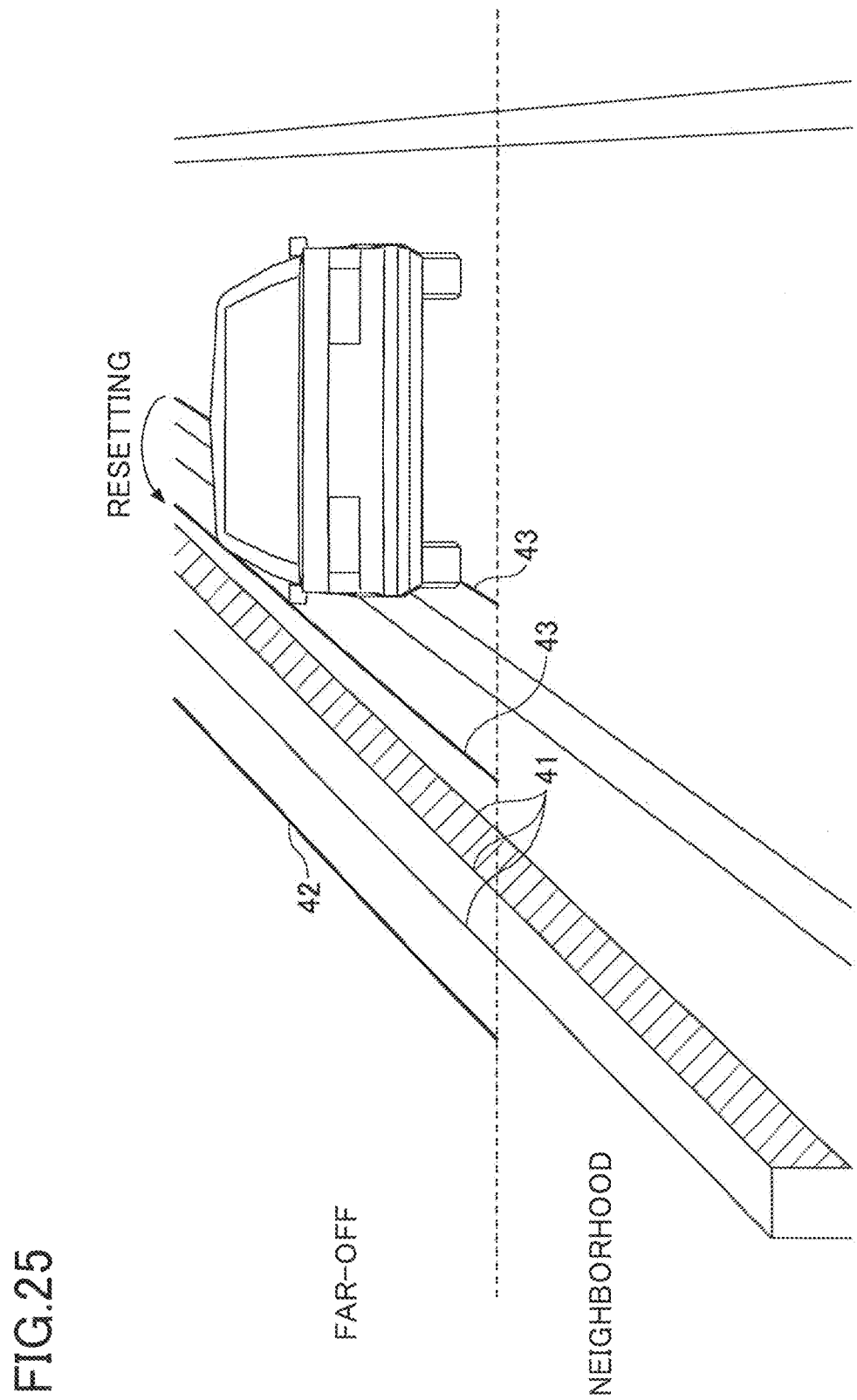
FIG. 25 is an example of a diagram illustrating setting of a search range by a search range setting unit.

FIG. 25 is an example of a diagram illustrating setting of the search range by a search range setting unit 29. A curbstone or a sidewalk step should be on the sidewalk side of a running preceding vehicle.

The search range setting unit 29 sets the search range by translating a virtual line 41, and at this moment, resets the search range so that the search range line 43 is not overlapped with the preceding vehicle. For example, the search range line 43 on the roadway side may be translated to the sidewalk side of the preceding vehicle. This makes it possible to narrow the search range while including the curbstone or sidewalk step, and to shorten time to detect edge line segments.

A method of detecting edge line segments in Step S90 is virtually the same as that in the first embodiment. Also, since the lateral position of the preceding vehicle in the past has a predetermined length or greater, the trajectory of the lateral positions may be taken as a white line to determine the parallelism and the distance similarly in the third embodiment.

In this way, in the present embodiment, the roadside object detection apparatus 100 can improve detection precision of a curbstone or a sidewalk step in a far-off region using a preceding vehicle.

As described above, the roadside object detection apparatus 100 in the present embodiment can detect the characteristic points of a far-off curbstone or sidewalk step with high precision, to obtain roadway parameters even if white lines are not detected. Also, it can be used as a clue to detect white lines.

Note that although the embodiments are separately described above, two or more of the first to fourth embodiments can be appropriately combined for usage. Also, although embodiments are described for detection methods of a curbstone or a sidewalk step, the present invention is not limited to the above embodiments, but various modifications and improvements can be made within the scope of the present invention. For example, other than a curbstone or a sidewalk step, a roadside object having a height from the road surface can be detected in substantially the same way.

This application is based upon and claims the benefit of priority of the prior Japanese Priority Application No. 2012-138141 filed on Jun. 19, 2012, the entire contents of which are hereby incorporated by reference.

The invention claimed is:

1. A roadside object detection apparatus to detect a roadside object using a plurality of captured images, comprising:
a processor programmed to:
analyze the captured images, and detect height information of an object in the captured images in a neighboring region, the neighboring region having a distance less than or equal to a threshold from a vehicle having the roadside object detection apparatus installed;
detect a change of a height of a road surface due to the roadside object from the height information in the neighboring region;
determine positions having the change of the height detected as characteristic points of the roadside object, define a road model based on the characteristic points, and extrapolate the road model into a far-off region, the far-off region having a distance greater than or equal to the threshold from the vehicle;
set a search range for the roadside object in the far-off region based on a virtual line that is obtained by the extrapolated road model being, and detect the roadside object in the far-off region based on the search range;
set the search range for the roadside object by translating the virtual line by predetermined distances to opposite directions in a symmetric or non-symmetric manner with respect to the virtual line; and
detect the roadside object in the far-off region by applying template matching to the search range with a template image for the neighboring region, the template image being cut off from the captured images and including the roadside object in the neighboring region.

2. The roadside object detection apparatus as claimed in claim 1, wherein the processor is further programmed to:
detect edges in the search range, generate one or more line segments from the edges, and identify the line segments originated from the characteristic points of the roadside object in the far-off region based on at least one of the number of the line segments, and lengths of the line segments.

3. The roadside object detection apparatus as claimed in claim 1, wherein the processor is further programmed to:
detect, based on at least one of the captured images, a lane separation mark that defines a lane in which the vehicle travels,
set the search range for the roadside object by translating the virtual line in a direction such that the translated virtual line is positioned between the virtual line and the lane separation mark that is closer to the vehicle among the lane separation marks on left and right with respect to a traveling direction, and by translating the virtual line by a predetermined distance in an opposite direction, and
detect edges in the search range, to generate one or more line segments from the edges, and identify the line segment generated from the characteristic points of the roadside object in the far-off region based on at least one of the number of the line segments, and lengths of the line segments.

4. The roadside object detection apparatus as claimed in claim 1, wherein the processor is further programmed to:
detect a preceding vehicle with at least a lateral position of the preceding vehicle,
set the search range for the roadside object by translating the virtual line in a direction such that the translated virtual line is positioned between the virtual line and the preceding vehicle, and by translating the virtual line by a predetermined distance in an opposite direction, and
detect edges in the search range, to generate one or more line segments from the edges, and identify the line segment generated from the characteristic points of the roadside object in the far-off region based on at least one of the number of the line segments, and lengths of the line segments.

5. The roadside object detection apparatus as claimed in claim 1, wherein the processor is further programmed to execute the template matching starting from a region closer to the vehicle in the search range, and when detecting the roadside object in the far-off region with the template image for the neighboring region, newly set a region including the detected roadside object as a template image to execute the template matching for a next close region to the vehicle in the search range.

6. The roadside object detection apparatus as claimed in claim 2, wherein the processor is further programmed to estimate an existence of a sidewalk step if the number of the line segments generated from the characteristic points of the roadside object in the far-off region is two, and estimate an existence of a curbstone if the number of the line segments is three.

7. The roadside object detection apparatus as claimed in claim 3, wherein the processor is further programmed to estimate an existence of a sidewalk step if the number of the line segments generated from the characteristic points of the roadside object in the far-off region is two, and estimate an existence of a curbstone if the number of the line segments is three.

8. The roadside object detection apparatus as claimed in claim 4, wherein the processor is further programmed to estimate an existence of a sidewalk step if the number of the line segments generated from the characteristic points of the roadside object in the far-off region is two, and estimate an existence of a curbstone if the number of the line segments is three.

\* \* \* \* \*

UNITED STATES PATENT AND TRADEMARK OFFICE
CERTIFICATE OF CORRECTION

PATENT NO. : 9,676,330 B2  
APPLICATION NO. : 14/402197  
DATED : June 13, 2017  
INVENTOR(S) : Yoshinao Takemae et al.

It is certified that error appears in the above-identified patent and that said Letters Patent is hereby corrected as shown below:

On the Title Page

Item (71), the Applicants information is incorrect. Item (71) should read:  
-- (71) Applicants: Yoshinao Takemae, Yokohama (JP);  
                  Akihiro Watanabe, Nagoya (JP);  
                  Fumiya Ichino, Nagakute (JP) --

Signed and Sealed this  
Seventeenth Day of April, 2018

Andrei Iancu  
*Director of the United States Patent and Trademark Office*